United States Patent
Edge

(10) Patent No.: US 8,965,413 B2
(45) Date of Patent: Feb. 24, 2015

(54) LOCATING A WIRELESS LOCAL AREA NETWORK ASSOCIATED WITH A WIRELESS WIDE AREA NETWORK

(75) Inventor: Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/041,251

(22) Filed: Mar. 4, 2011

(65) Prior Publication Data

US 2011/0149789 A1    Jun. 23, 2011

Related U.S. Application Data

(63) Continuation of application No. 11/691,416, filed on Mar. 26, 2007.

(60) Provisional application No. 60/792,252, filed on Apr. 12, 2006.

(51) Int. Cl.
| | | |
|---|---|---|
| *H04W 24/00* | (2009.01) | |
| *H04W 48/16* | (2009.01) | |
| *H04W 36/32* | (2009.01) | |
| *H04W 64/00* | (2009.01) | |
| *H04W 84/12* | (2009.01) | |

(52) U.S. Cl.
CPC ............. *H04W 48/16* (2013.01); *H04W 24/00* (2013.01); *H04W 36/32* (2013.01); *H04W 64/00* (2013.01); *H04W 84/12* (2013.01)
USPC ...................................... 455/456.6; 455/456.1

(58) Field of Classification Search
USPC .................................. 455/446, 456.1–456.6
See application file for complete search history.

(56) References Cited

U.S. PATENT DOCUMENTS

| | | | |
|---|---|---|---|
| 4,631,720 A | 12/1986 | Koeck | |
| 4,660,196 A | 4/1987 | Gray et al. | |
| 4,679,244 A | 7/1987 | Kawasaki et al. | |
| 4,833,701 A | 5/1989 | Comroe et al. | |
| 5,128,938 A | 7/1992 | Borras | |
| 5,203,013 A | 4/1993 | Breeden et al. | |
| 5,387,905 A | 2/1995 | Grube et al. | |

(Continued)

FOREIGN PATENT DOCUMENTS

| | | |
|---|---|---|
| CL | 36052006 | 6/2007 |
| CL | 36042006 | 7/2007 |

(Continued)

OTHER PUBLICATIONS

3GPP: ETSI TS 125 331 V6.3.0: Radio Resource Control (RRC) protocol specification (3GPP TS 25.331 version 6.3.0 Release 6), Sep. 1, 2004, pp. 49, 202-209, 220,221,406,579-585, 589, 930.

(Continued)

*Primary Examiner* — German J Viana Di Prisco
(74) *Attorney, Agent, or Firm* — Thien T. Nguyen

(57) ABSTRACT

An apparatus and method are disclosed in connection with a mobile device locating a wireless local area network (WLAN) associated with a wireless wide area network (WWAN). These concepts involve obtaining and recording maximum and minimum geometric time differences (GTDs) for a pair or pairs of transmitters in the WWAN while coverage is provided by the WLAN, and using these differences to later compare a contemporaneous GTD to determine whether the mobile device is more likely within the coverage area of the WLAN.

17 Claims, 13 Drawing Sheets

(56) References Cited

U.S. PATENT DOCUMENTS

| | | |
|---|---|---|
| 5,434,848 A | 7/1995 | Chimento, Jr. et al. |
| 5,461,645 A | 10/1995 | Ishii |
| 5,465,389 A | 11/1995 | Agrawal et al. |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann, Jr. et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe |
| 6,028,842 A | 2/2000 | Chapman et al. |
| 6,028,843 A | 2/2000 | Delp et al. |
| 6,035,000 A | 3/2000 | Bingham |
| 6,069,871 A | 5/2000 | Sharma et al. |
| 6,070,072 A | 5/2000 | Dorenbosch et al. |
| 6,073,025 A | 6/2000 | Chheda et al. |
| 6,075,025 A | 6/2000 | Bishop et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 | 1/2001 | Kotzin et al. |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley |
| 6,298,233 B1 | 10/2001 | Souissi et al. |
| 6,308,080 B1 | 10/2001 | Burt et al. |
| 6,310,857 B1 | 10/2001 | Duffield et al. |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita |
| 6,549,780 B2 | 4/2003 | Schiff et al. |
| 6,553,336 B1 | 4/2003 | Johnson et al. |
| 6,590,890 B1 | 7/2003 | Stolyar et al. |
| 6,597,914 B1 * | 7/2003 | Silventoinen et al. ..... 455/456.1 |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso |
| 6,680,909 B1 | 1/2004 | Bansal et al. |
| 6,697,417 B2 | 2/2004 | Fernandez-Corbaton et al. |
| 6,710,651 B2 | 3/2004 | Forrester |
| 6,728,551 B2 | 4/2004 | Chang |
| 6,742,020 B1 | 5/2004 | Dimitroff et al. |
| 6,745,003 B1 | 6/2004 | Maca et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,816,476 B2 | 11/2004 | Kim et al. |
| 6,836,673 B1 | 12/2004 | Trott |
| 6,865,168 B1 | 3/2005 | Sekine |
| 6,889,056 B2 | 5/2005 | Shibutani |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang |
| 6,901,270 B1 | 5/2005 | Beach |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmas et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz |
| 7,092,672 B1 | 8/2006 | Pekonen et al. |
| 7,120,123 B1 | 10/2006 | Quigley et al. |
| 7,120,448 B2 | 10/2006 | Brouwer |
| 7,123,910 B2 | 10/2006 | Lucidarme et al. |
| 7,139,536 B2 | 11/2006 | Chiu |
| 7,142,548 B2 | 11/2006 | Fong et al. |
| 7,146,172 B2 | 12/2006 | Li et al. |
| 7,158,796 B2 | 1/2007 | Tiedemann, Jr. et al. |
| 7,161,909 B2 | 1/2007 | Sharma |
| 7,162,203 B1 | 1/2007 | Brunner |
| 7,164,883 B2 | 1/2007 | Rappaport et al. |
| 7,197,025 B2 | 3/2007 | Chuah |
| 7,203,493 B2 | 4/2007 | Fujii et al. |
| 7,212,821 B2 | 5/2007 | Laroia et al. |
| 7,218,948 B2 | 5/2007 | Laroia et al. |
| 7,245,935 B2 | 7/2007 | Lin |
| 7,260,054 B2 | 8/2007 | Olszewski |
| 7,269,406 B2 | 9/2007 | Qi |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,317,921 B2 | 1/2008 | Mueckenheim et al. |
| 7,319,680 B2 | 1/2008 | Cho |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme |
| 7,420,939 B2 | 9/2008 | Laroia et al. |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,447,148 B2 | 11/2008 | Gao et al. |
| 7,463,577 B2 | 12/2008 | Sudo et al. |
| 7,486,620 B2 | 2/2009 | Seol |
| 7,486,638 B2 | 2/2009 | Ofuji et al. |
| 7,502,614 B2 | 3/2009 | Uchida et al. |
| 7,508,792 B2 | 3/2009 | Petrovic et al. |

(56) References Cited

U.S. PATENT DOCUMENTS

| | | |
|---|---|---|
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,539,475 B2 | 5/2009 | Laroia et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,040,831 B2 | 10/2011 | Kurtz et al. |
| 8,325,621 B2 | 12/2012 | Simonsson et al. |
| 8,437,251 B2 | 5/2013 | Das et al. |
| 2001/0036181 A1 | 11/2001 | Rogers |
| 2001/0055293 A1 | 12/2001 | Parsa et al. |
| 2002/0031105 A1 | 3/2002 | Zeira et al. |
| 2002/0037729 A1 | 3/2002 | Kitazawa et al. |
| 2002/0075835 A1 | 6/2002 | Krishnakumar et al. |
| 2002/0080967 A1 | 6/2002 | Abdo et al. |
| 2002/0085516 A1 | 7/2002 | Bridgelall |
| 2002/0093953 A1 | 7/2002 | Naim et al. |
| 2002/0107028 A1* | 8/2002 | Rantalainen et al. ......... 455/456 |
| 2002/0143858 A1 | 10/2002 | Teague et al. |
| 2002/0177452 A1 | 11/2002 | Ruutu et al. |
| 2002/0186678 A1 | 12/2002 | Averbuch et al. |
| 2003/0007498 A1 | 1/2003 | Angle et al. |
| 2003/0012212 A1 | 1/2003 | Earnshaw et al. |
| 2003/0027587 A1 | 2/2003 | Proctor, Jr. |
| 2003/0064737 A1 | 4/2003 | Eriksson et al. |
| 2003/0100269 A1 | 5/2003 | Lehtinen et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0144042 A1 | 7/2003 | Weinfield et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0198204 A1 | 10/2003 | Taneja et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2004/0001429 A1 | 1/2004 | Ma et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari et al. |
| 2004/0082344 A1* | 4/2004 | Moilanen et al. ......... 455/456.3 |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120411 A1 | 6/2004 | Walton et al. |
| 2004/0125776 A1 | 7/2004 | Haugli et al. |
| 2004/0131007 A1 | 7/2004 | Smee et al. |
| 2004/0147276 A1 | 7/2004 | Gholmieh et al. |
| 2004/0160922 A1 | 8/2004 | Nanda et al. |
| 2004/0162097 A1 | 8/2004 | Vijayan et al. |
| 2004/0166869 A1 | 8/2004 | Laroia et al. |
| 2004/0166887 A1 | 8/2004 | Laroia et al. |
| 2004/0171401 A1 | 9/2004 | Balachandran et al. |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0218617 A1 | 11/2004 | Sagfors |
| 2004/0224677 A1 | 11/2004 | Kuchibhotla et al. |
| 2004/0228313 A1 | 11/2004 | Cheng et al. |
| 2004/0235510 A1 | 11/2004 | Elicegui et al. |
| 2004/0248518 A1 | 12/2004 | Kashiwase |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2005/0008892 A1 | 1/2005 | Yamamoto et al. |
| 2005/0037775 A1* | 2/2005 | Moeglein et al. .......... 455/456.1 |
| 2005/0047393 A1 | 3/2005 | Liu |
| 2005/0047416 A1 | 3/2005 | Heo et al. |
| 2005/0053099 A1 | 3/2005 | Spear et al. |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0111361 A1 | 5/2005 | Hosein |
| 2005/0111462 A1 | 5/2005 | Walton et al. |
| 2005/0118993 A1 | 6/2005 | Roux et al. |
| 2005/0122900 A1 | 6/2005 | Tuulos et al. |
| 2005/0135320 A1 | 6/2005 | Tiedemann et al. |
| 2005/0136937 A1 | 6/2005 | Qian et al. |
| 2005/0143084 A1 | 6/2005 | Cheng et al. |
| 2005/0152320 A1 | 7/2005 | Marinier et al. |
| 2005/0157803 A1 | 7/2005 | Kim et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0034174 A1 | 2/2006 | Nishibayashi et al. |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0126497 A1 | 6/2006 | Na et al. |
| 2006/0128410 A1 | 6/2006 | Derryberry et al. |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0164981 A1 | 7/2006 | Olsson et al. |
| 2006/0165029 A1 | 7/2006 | Melpignano et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0004437 A1 | 1/2007 | Harada et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0030828 A1 | 2/2007 | Vimpari et al. |
| 2007/0036116 A1 | 2/2007 | Eiger et al. |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081498 A1 | 4/2007 | Niwano |
| 2007/0104128 A1 | 5/2007 | Laroia et al. |

(56) References Cited

U.S. PATENT DOCUMENTS

| | | |
|---|---|---|
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0169326 A1 | 7/2007 | Smith |
| 2007/0173208 A1 | 7/2007 | Nishio et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das et al. |
| 2007/0253385 A1 | 11/2007 | Li et al. |
| 2007/0253449 A1 | 11/2007 | Das et al. |
| 2007/0258365 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2009/0004983 A1 | 1/2009 | Darabi |
| 2009/0034455 A1 | 2/2009 | Lee et al. |
| 2009/0103507 A1 | 4/2009 | Gu et al. |
| 2009/0106507 A1 | 4/2009 | Skerlj et al. |
| 2009/0303900 A1 | 12/2009 | Cho et al. |
| 2010/0220626 A1 | 9/2010 | Das et al. |
| 2011/0090812 A1 | 4/2011 | Aoyama |
| 2012/0140756 A1 | 6/2012 | Rudolf et al. |
| 2013/0230027 A1 | 9/2013 | Das et al. |
| 2013/0242888 A1 | 9/2013 | Das et al. |

FOREIGN PATENT DOCUMENTS

| | | |
|---|---|---|
| CL | 36032006 | 5/2010 |
| CN | 1159262 A | 9/1997 |
| CN | 1265792 | 9/2000 |
| CN | 1286006 A | 2/2001 |
| CN | 1286832 A | 3/2001 |
| CN | 1316140 | 10/2001 |
| CN | 1335036 A | 2/2002 |
| CN | 1338877 A | 3/2002 |
| CN | 1507708 | 6/2004 |
| CN | 1545252 A | 11/2004 |
| CN | 1604685 | 4/2005 |
| DE | 10162564 A1 | 7/2003 |
| EP | 1037419 A2 | 9/2000 |
| EP | 1037491 A1 | 9/2000 |
| EP | 1054518 A1 | 11/2000 |
| EP | 1089500 A2 | 4/2001 |
| EP | 1179962 A2 | 2/2002 |
| EP | 1180881 | 2/2002 |
| EP | 1180907 A2 | 2/2002 |
| EP | 1207645 A1 | 5/2002 |
| EP | 1221273 A1 | 7/2002 |
| EP | 1233637 A1 | 8/2002 |
| EP | 1493284 A1 | 1/2005 |
| EP | 1511245 A2 | 3/2005 |
| EP | 1564953 A2 | 8/2005 |
| EP | 1571762 A1 | 9/2005 |
| EP | 1594260 A1 | 11/2005 |
| EP | 1377100 A2 | 1/2007 |
| EP | 1758276 A1 | 2/2007 |
| EP | 1841259 A2 | 10/2007 |
| GB | 2340693 A | 2/2000 |
| JP | 06268574 | 9/1994 |
| JP | 08008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 A | 4/1999 |
| JP | 2000049689 A | 2/2000 |
| JP | 2001007761 | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001516975 | 10/2001 |
| JP | 2001523901 T | 11/2001 |
| JP | 2001525135 T | 12/2001 |
| JP | 2002077992 | 3/2002 |
| JP | 2002111627 | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 | 3/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 2006526323 A | 11/2006 |
| JP | 2007503156 A | 2/2007 |
| JP | 2007509531 | 4/2007 |
| JP | 2007514364 A | 5/2007 |
| JP | 2007514378 T | 5/2007 |
| JP | 2007522692 A | 8/2007 |
| JP | 2007525044 A | 8/2007 |
| JP | 2007525045 | 8/2007 |
| JP | 2006518578 A | 3/2011 |
| JP | 2011045054 | 3/2011 |
| JP | 2006524966 T | 5/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 A | 3/2005 |
| KR | 20050023187 A | 3/2005 |
| KR | 20050039376 A | 4/2005 |
| KR | 1020050099633 | 10/2005 |
| KR | 1020050121274 | 12/2005 |
| KR | 20060012282 A | 2/2006 |
| RU | 2149518 | 5/2000 |
| RU | 2181529 | 4/2002 |
| RU | 2188506 C2 | 8/2002 |
| RU | 2202154 C2 | 4/2003 |
| TW | 200423642 | 11/2004 |
| WO | WO-9408432 | 4/1994 |

(56) References Cited

FOREIGN PATENT DOCUMENTS

| WO | WO9623371 | | 8/1996 |
|---|---|---|---|
| WO | WO9845967 | A2 | 10/1998 |
| WO | WO98056120 | | 12/1998 |
| WO | 9907090 | A1 | 2/1999 |
| WO | WO-9909779 | A1 | 2/1999 |
| WO | WO9913600 | A1 | 3/1999 |
| WO | WO9959254 | A2 | 11/1999 |
| WO | WO0101610 | | 1/2001 |
| WO | WO-0122759 | A1 | 3/2001 |
| WO | WO0135548 | | 5/2001 |
| WO | WO-0142047 | A2 | 6/2001 |
| WO | WO0182504 | | 11/2001 |
| WO | WO-0199291 | A2 | 12/2001 |
| WO | WO0232183 | | 4/2002 |
| WO | WO0233841 | A1 | 4/2002 |
| WO | WO0239760 | A2 | 5/2002 |
| WO | WO0249305 | A2 | 6/2002 |
| WO | WO02073831 | A1 | 9/2002 |
| WO | WO02101941 | A2 | 12/2002 |
| WO | WO02104058 | A1 | 12/2002 |
| WO | WO03094544 | A1 | 11/2003 |
| WO | WO03105498 | A1 | 12/2003 |
| WO | WO-2004031918 | A2 | 4/2004 |
| WO | 2004077728 | A2 | 9/2004 |
| WO | WO2004077685 | | 9/2004 |
| WO | WO2004084452 | | 9/2004 |
| WO | WO2004084503 | A2 | 9/2004 |
| WO | WO2004100450 | A1 | 11/2004 |
| WO | WO2004105420 | A1 | 12/2004 |
| WO | WO2004110081 | A1 | 12/2004 |
| WO | WO-2005018115 | A1 | 2/2005 |
| WO | 2005020490 | | 3/2005 |
| WO | WO2005034438 | | 4/2005 |
| WO | 2005057812 | A1 | 6/2005 |
| WO | WO2005060132 | | 6/2005 |
| WO | WO2005060271 | A1 | 6/2005 |
| WO | WO2005060277 | | 6/2005 |
| WO | WO2005065056 | A2 | 7/2005 |
| WO | WO2005069519 | | 7/2005 |
| WO | WO2005125049 | | 12/2005 |
| WO | WO2006044718 | | 4/2006 |
| WO | WO2006075293 | A1 | 7/2006 |
| WO | WO2007031956 | A2 | 3/2007 |

OTHER PUBLICATIONS

3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.
Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
Ericsson: Discussion on SIR Measurement, TSG-RAN Working Group 4 (Radio) meeting #18, R4-010895, Berlin, Germany, 3GPP TS 25.101 V3.7.0, Jul. 9, 2001, URL: http://www.3gpp.org/ftp/tsg_ran/WG4_Radio/TSGR4_18/Docs/R4-010895.zip.
Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).
Gunnarsson, G. et al.,"Location Trial System for Mobile Phones," Global Telecommunications Conference, 1998. GLOBECOM 98. The Bridge to Global Integration. IEEE, vol. 4, pp. 2211-2216, Nov. 8-12, 1998.
Hang Zhang, et al., "Clean up for Closed-Loop MIMO in H-ARQ MAP IE", IEEE P802.16e/D7 Broadband Wireless Access Working Group <http://ieee802.org/16>, pp. 1-6, Mar. 10, 2010.
Hobfeld, T. et al., "Supporting Vertical Handover by Using a Pastry Peer-to-Peer Overlay Network," Fourth Annual IEEE International Conference on Pervasive Computing and Communications Workshops, 2006. PERCOM Workshops 2006. Mar. 13-17, 2006, pp. 163-167, p. 164, paragraph III, IEEE, Piscataway, NJ, USA, XP010910514, ISBN: 0-7695-2520-2.
Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-20, 2004, pp. 654-658.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.
Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.
Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.
Taiwan Search Report—TW096112923—TIPO—Jan. 18, 2012.
TIM/TILAB, Blu, Mobilkom Austria, One2one,Telefonica: "Re-introduction of SIR measurement," 3GPP TSG-RAN4 Meeting #17, R4-010647, 3GPP, Goteborg, Sweden, May 21, 2001, URL: http://www.3gpp.org/ftp/tsg_ran/WG4_Radio/TSGR4_17/Docs/R4-010647.Zip.
Wada, "A Study of OFDM Cellular System Using Single Band" Proceedings 1 of the 2002 Communications Society Conference, Japan, The Institute of Electronics, Information and Communication Engineers, Aug. 20, 2002, p. 355, B-5-58.

* cited by examiner

WIRELESS TERMINAL
102

LOCATING A WIRELESS LOCAL AREA NETWORK ASSOCIATED WITH A WIRELESS WIDE AREA NETWORK

CROSS-REFERENCE TO RELATED APPLICATIONS

This application is a continuation application under 35 U.S.C. §120, and claims the benefit of and priority to application Ser. No. 11/691,416, filed Mar. 26, 2007 and titled "Locating a wireless local area network associated with a wireless wide area network", which claims the benefit of and priority under 35 U.S.C. §119(e) to U.S. Provisional Application No. 60/792,252, filed Apr. 12, 2006, titled "Support of WLAN access in association with WWAN", both of which are incorporated herein by reference.

BACKGROUND

I. Field of the Invention

The present disclosure relates generally to telecommunications, and more particularly, to concepts for locating a wireless local area network associated with a wireless wide area network.

II. Background

Wireless networks, such as those supporting GSM, WCDMA, cdma2000 and TDMA, commonly provide wireless coverage over a large geographic area—for example, a city, metropolitan area, a state or county or sometimes a whole country. Such networks are sometimes referred to as WWANs (Wireless Wide Area Networks). Recently, smaller wireless networks known as WLANs (Wireless Local Area Networks) have been standardized, for example by the IEEE 802.11 committee, and deployed to cover small areas with a geographic coverage ranging from a few tens of meters to a few hundred meters. To enable wider coverage using these networks, it is common to deploy many such networks in different adjacent areas. In some cases, the ensemble of such multiple WLANs may be considered as a small WWAN in its own right with each "cell" of the WWAN being supported by a single WLAN. Such WLANs or WLAN ensembles may be owned and operated by independent operators or by the same operators who own and run WWANs or by individual subscribers (e.g., home or office WLANs).

For WWAN operators who own WLANs or have a business arrangement with WLAN operators (e.g., including WWAN subscribers who own WLANs), there may be an advantage in allowing or assisting wireless terminals to access such WLANs as a means of extending coverage (e.g., into areas served by WLANs but not by WWANs) and/or increasing capacity in the case that existing WWAN resources (e.g., available spectrum) are insufficient to serve all subscribers. For example, extension of coverage may be an advantage in areas harder to reach by WWANs (e.g., within shopping malls, inside homes and offices) while increasing capacity may be an advantage in the most heavily used areas (e.g., urban environments), during peak usage times and to reduce WWAN resource utilization.

In the event that wireless terminals are allowed or may be required to use certain WLANs when available, it may become necessary to make the terminal aware that a particular WLAN or set of WLANs is or are available at any particular location in which the terminal happens to be. This could be supported by having the wireless terminal perform periodic searches for available WLANs and then, if a suitable WLAN is found and its signal strength is deemed adequate, have the terminal transfer its service to the WLAN (e.g., via registration on the WLAN and handover of any ongoing services, such as a call, that the terminal may be engaged in). The problem with this simple approach is that any frequent scanning for available WLANs may consume excessive resources in the terminal (e.g., battery) as well as interfere with ongoing services. Furthermore, if maintaining ongoing services has higher priority, it may not always be possible to adequately scan for available WLANs. It could thus be an advantage to have other methods of finding available and suitable WLANs that do not involve excessive resource utilization in a terminal or conflict with the support of existing services.

One such method has been defined to support WLAN access from terminals using CDMA, for example cdma2000, WWANs. This method makes use of the fact that transmissions from CDMA base stations can be synchronized. Specifically, the concept makes use of synchronized timing in CDMA base stations which enables a wireless terminal to measure pilot phases from nearby base stations and use these to indicate its approximate geographic location. By recording pilot phases associated with the availability of a particular WLAN, the handset can, at a later time, determine the proximity of the same WLAN when it measures the same pilot phases that it had recorded previously. This enables a wireless terminal to perform handover to the WLAN (once it is detected) and help alleviate congestion on a normal WWAN or extend WWAN coverage.

However, the above concept does not address asynchronous networks like GSM and WCDMA because information equivalent to CDMA pilot phases is not supported in these networks in a form that can be directly used. Accordingly, there exists a need for new technology that may be used to help locate WLANs in association with both asynchronous and synchronous WWANs.

BRIEF SUMMARY

One aspect of a method for locating a first network is disclosed. The method includes obtaining the difference in transmission time of a marker between two transmitters in a second network, measuring the difference in arrival time of the marker between the two transmitters, and locating the first network based on the difference in transmission time and the difference in arrival time of the marker.

An aspect of a wireless terminal configured to operate in a first network is disclosed. The wireless terminal includes at least one processor configured to obtain the difference in transmission time of a marker between two transmitters in a second network, measure the difference in arrival time of the marker between the two transmitters, and locate the first network based on the difference in transmission time and the difference in arrival time of the marker.

Another aspect of a wireless terminal configured to operate in a first network is disclosed. The wireless terminal includes means for obtaining the difference in transmission time of a marker between two transmitters in a second network, means for measuring the difference in arrival time of the marker between the two transmitters, and means for locating the first network based on the difference in transmission time and the difference in arrival time of the marker.

An aspect of a computer program product is disclosed. The computer program product includes computer-readable medium. The computer readable medium includes code for causing at least one computer to obtain the difference in transmission time of a marker between two transmitters in a second network, code for causing the at least one computer to measure the difference in arrival time of the marker between the two transmitters, and code for causing the at least one computer to locate the first network based on the difference in transmission time and the difference in arrival time of the marker.

It is understood that other configurations of the present invention will become readily apparent to those skilled in the art from the following detailed description, wherein it is shown and described various configurations of the invention by way of illustration. As will be realized, the invention is capable of other and different configurations and its several details are capable of modification in various other respects, all without departing from the spirit and scope of the present invention. Accordingly, the drawings and detailed description are to be regarded as illustrative in nature and not as restrictive.

Disclosed is an apparatus and method for a mobile device to locate a WLAN (wireless local area network) using signals from one or more pairs of transmitters. According to some aspects, disclosed is a method for a mobile device to locate a wireless local area network (WLAN), the method comprising: recording geometric time difference (GTD) statistics for the WLAN comprising: recording a first minimum GTD between a first pair of transmitters; and recording a first maximum GTD between the first pair of transmitters; computing a first current GTD based on current measurements from the first pair of transmitters; and checking for coverage within the WLAN based on the first current GTD being between the first minimum GTD and the first maximum GTD.

According to some aspects, disclosed is a mobile device for locating a wireless local area network (WLAN), the mobile device comprising a processor and memory wherein the memory includes software instructions to: record geometric time difference (GTD) statistics for the WLAN comprising software instructions to: record a first minimum GTD between a first pair of transmitters; and record a first maximum GTD between the first pair of transmitters; compute a first current GTD based on current measurements from the first pair of transmitters; and check for coverage within the WLAN based on the first current GTD being between the first minimum GTD and the first maximum GTD.

According to some aspects, disclosed is a mobile device for locating a wireless local area network (WLAN), the mobile device comprising: means for recording geometric time difference (GTD) statistics for the WLAN comprising: means for recording a first minimum GTD between a first pair of transmitters; and means for recording a first maximum GTD between the first pair of transmitters; means for computing a first current GTD based on current measurements from the first pair of transmitters; and means for checking for coverage within the WLAN based on the first current GTD being between the first minimum GTD and the first maximum GTD.

According to some aspects, disclosed is a computer program product, comprising a computer usable medium having a computer-readable program code embodied therein, said computer-readable program code adapted to be executed to implement a method for generating a report, said method comprising: recording geometric time difference (GTD) statistics for the WLAN comprising: recording a first minimum GTD between a first pair of transmitters; and recording a first maximum GTD between the first pair of transmitters; computing a first current GTD based on current measurements from the first pair of transmitters; and checking for coverage within the WLAN based on the first current GTD being between the first minimum GTD and the first maximum GTD.

According to some aspects, disclosed is a non-volatile computer-readable storage medium including program code stored thereon, comprising program code to: record geometric time difference (GTD) statistics for the WLAN comprising program code to: record a first minimum GTD between a first pair of transmitters; and record a first maximum GTD between the first pair of transmitters; compute a first current GTD based on current measurements from the first pair of transmitters; and check for coverage within the WLAN based on the first current GTD being between the first minimum GTD and the first maximum GTD.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Various aspects of a wireless communications system are illustrated by way of example, and not by way of limitation, in the accompanying drawings, wherein.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, a "storage medium" may represent one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage mediums, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the certain tasks may be stored in a machine readable medium such as a storage medium. A processor also may perform such tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It should also be apparent to those skilled in the art that one or more elements of a device disclosed below may be rearranged without affecting the operation of the device. Similarly, one or more elements of a device disclosed below may be combined without affecting the operation of the device.

1. Wireless Network Environment

Figure 1:
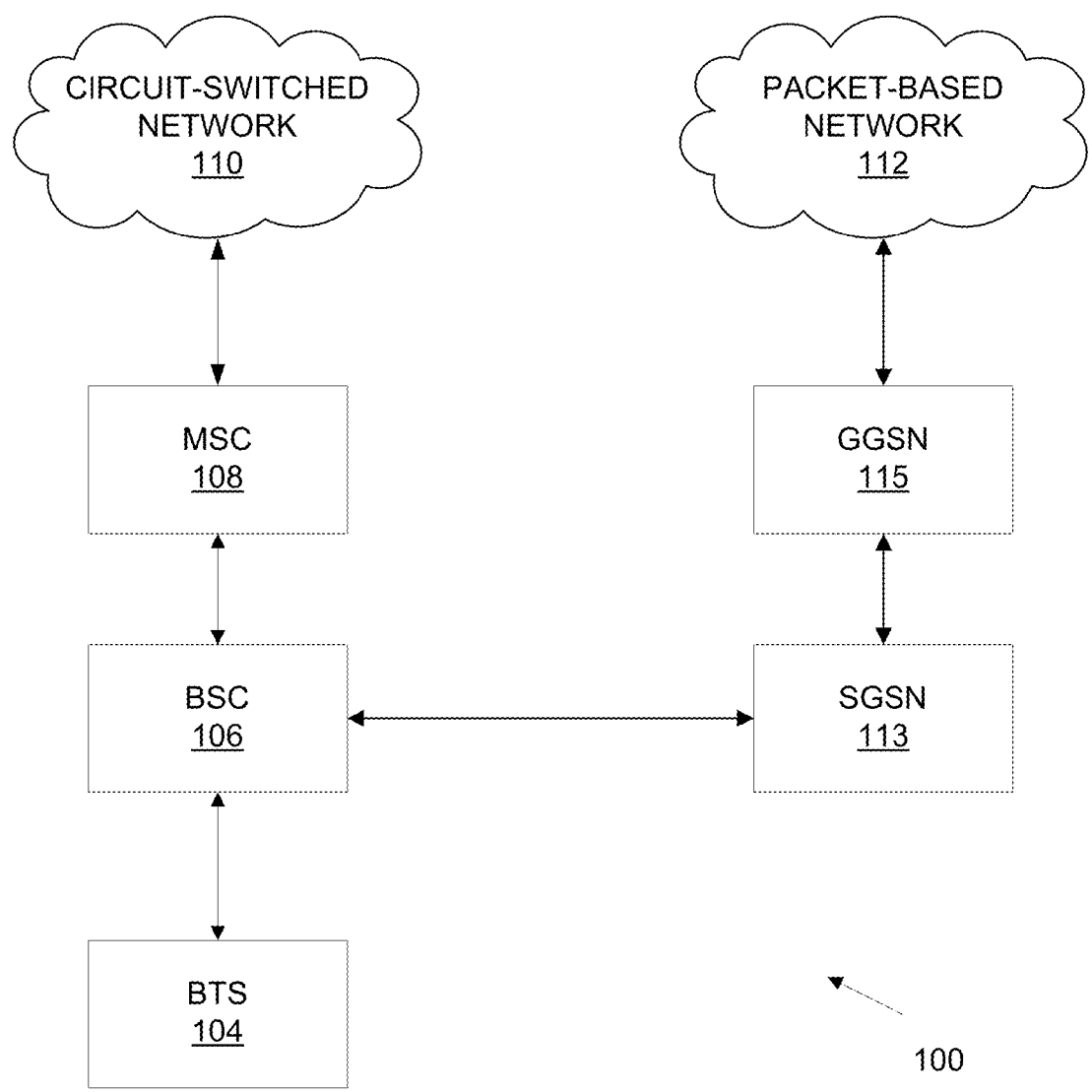
FIG. 1 is a conceptual diagram showing a wireless terminal in communication with a WWAN.
Figure 1:
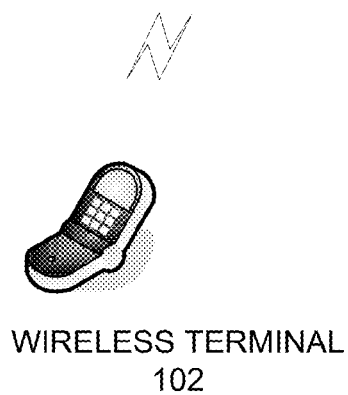

FIG. 1 is a conceptual diagram showing a wireless terminal 102 in communication with a WWAN 100. The wireless terminal 102 may be any suitable wireless terminal, including by way of example, a mobile or cellular telephone, a personal digital assistant (PDA), a portable television, a personal computer, a laptop computer, a digital camera, a digital camcorder, a game console, a portable audio device, a portable radio, transceiver, modem, or any other suitable device capable of accessing the WWAN 100. The wireless terminal 102 may be referred to by those skilled in the art as a handset, wireless communications device, user terminal, user equipment, mobile station, mobile unit, subscriber unit, subscriber station, mobile radio, radio telephone, wireless station, wireless device, or some other terminology. The various concepts described throughout this disclosure are intended to apply all suitable wireless terminals regardless of their configuration and specific nomenclature.

A typical WWAN 100 is a cellular network. A cellular network is a network in which the geographic coverage region is broken up into cells. Within each cell is a BTS (Base Transceiver Station) that communicates with wireless terminals. For clarity of presentation, a single BTS 104 is shown with a backhaul connected to a BSC (Base Station Controller) 106, however, in real world applications, the BSC 106 will support backhaul connections with many BTSs. The BSC 106 is used to manage and coordinate the BTSs in the WWAN 100 so multiple wireless terminals can communicate. The WWAN 100 may also be connected to additional networks through one or more suitable gateways. In the example shown in FIG. 1, the WWAN 100 is connected through a MSC (Mobile Switching Center) 108 to a circuit-switched network 110, such as a PSTN (Public Switched Telephone Network). The WWAN 100 may also be connected to a packet-based network 112, such as the public Internet, through a SGSN (Serving General Packet Radio Service Support Node) 113 and a GGSN (Gateway General Packet Radio Service Support Node) 115. The SGSN 113 facilitates exchanges of packets between the BSC 106 and the GGSN 115 and also performs mobility management for the wireless terminals 102. The GGSN 115 performs routing functions and exchanges packets with the packet-based network 112.

Figure 2:
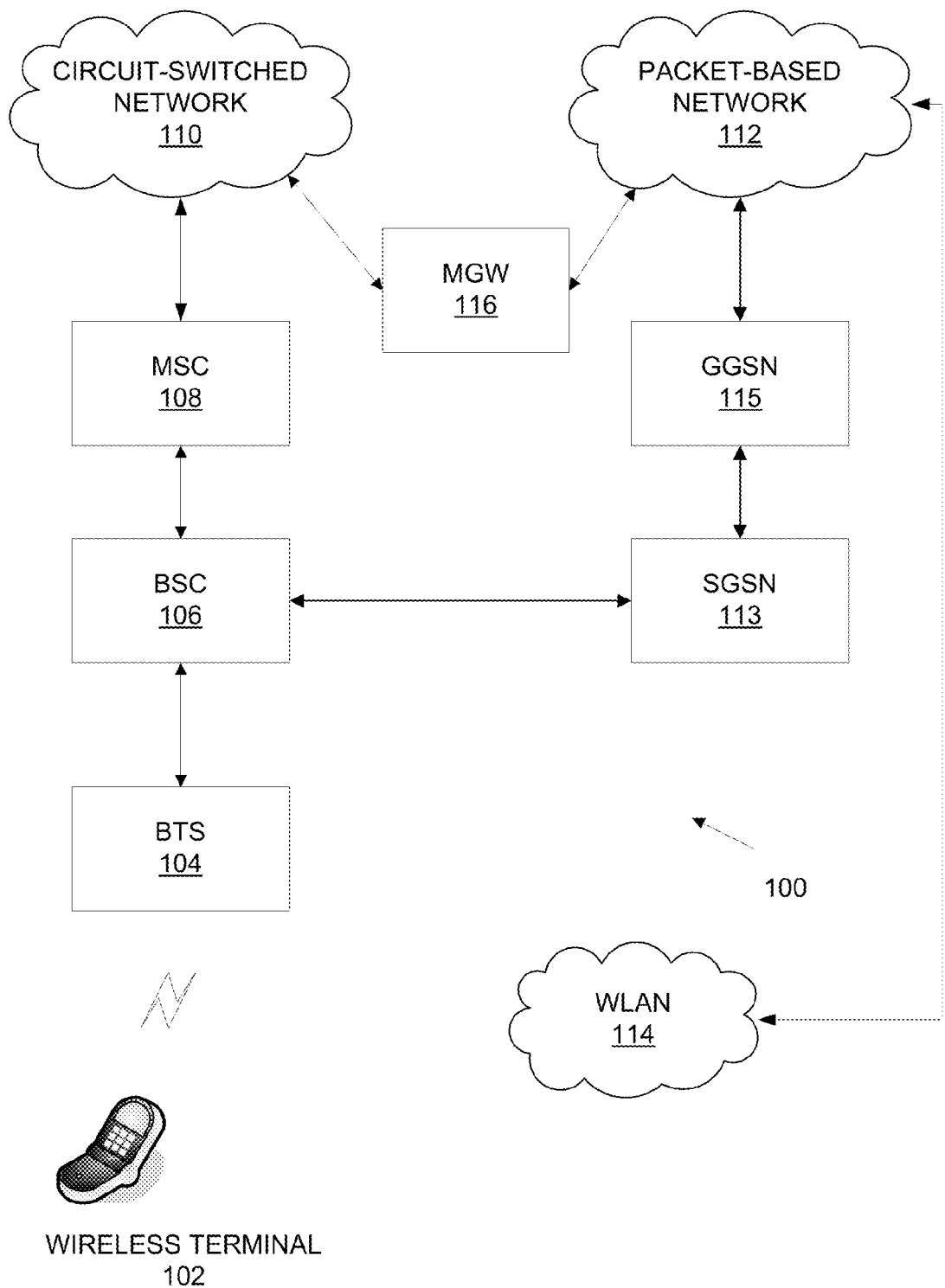
FIG. 2 is a conceptual diagram showing a WLAN connected to a WWAN through a packet-switched network.

FIG. 2 is a conceptual diagram showing a WLAN 114 connected to the WWAN 100 through the packet-based network 112. The WLAN 114 may provide extended coverage to wireless terminals and/or increase the capacity of the WWAN 100 using any suitable wireless protocol including IEEE 802.11, Ultra Wide Band (UWB), or Bluetooth, just to name a few. The actual wireless protocol implemented in any particular WLAN will depend on the specific application and the overall design constraints imposed on the overall system. A MGW 116 (Media Gateway) is used to help interface the WLAN 114 to the circuit-switched network 110—e.g. to support voice calls.

Figure 3:
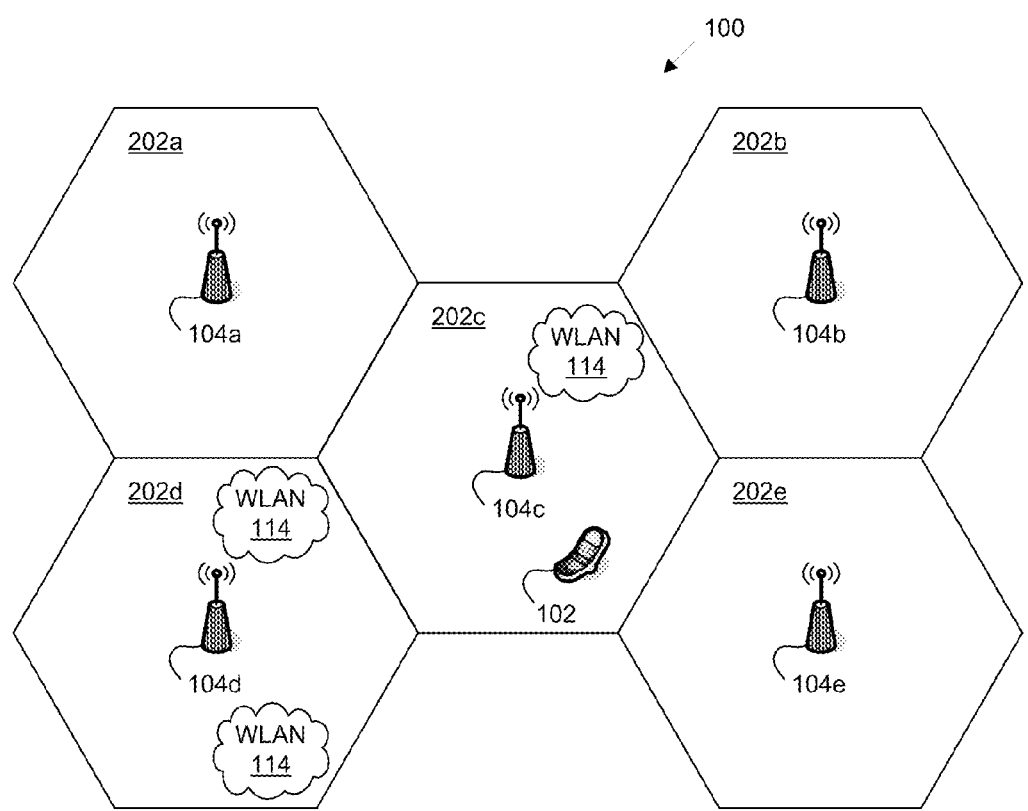
FIG. 3 is a conceptual diagram showing the topology of a WWAN.

FIG. 3 is a conceptual diagram showing the topology of a WWAN 100. In this example, the WWAN 100 is broken up into five cells 202a-202e. A BTS 104a-104e is located in each cell 202a-202e, respectively. In addition, three WLANs 114 are dispersed throughout the geographic coverage region of the WWAN 100. As the wireless terminal 102 moves throughout the WWAN 100, it may employ various techniques to learn of the existence of WLANs in different locations. These techniques make use of transmissions from a pair of BTSs belonging to the WWAN 100 or multiple WWANs. These techniques may be applied to both asynchronous and synchronous WWANs.

The techniques make use of the concepts of OTD (Observed Time Difference), RTD (Real Time Difference) and GTD (Geometric Time Difference). The OTD is the difference in the arrival times at a wireless terminal of specifically tagged or otherwise identified or identifiable signals from a pair of BTSs. For example, for GSM, the OTD could be the time following detection at a wireless terminal of the start of one GSM frame from one BTS until the detection at the wireless terminal of start of the next GSM frame from another BTS. The OTD is closely associated with the RTD, which provides the OTD without the effect of propagation delay, for example, the time following the start of any GSM frame at one BTS until the start of the next GSM frame at the other BTS. OTD equals RTD for any wireless terminal that is equidistant from the pair of BTSs.

An example will now be given with reference to FIG. 4. The difference between the OTD observed by the wireless terminal 102 at any location L for a pair of BTSs P and Q and the RTD between these BTSs provides the GTD. The relationships can be represented as follows.

Let: $M_R$=a transmission marker (e.g., start of a frame in GSM) from BTS R $T(M_R)$=Absolute transmission time of marker $M_R$ at BTS R $A(M_R)$=Absolute arrival time of marker $M_R$ at Location L where R=P or Q then: $OTD = A(M_R) - A(M_Q)$ $RTD = T(M_R) - T(M_Q)$.

Let: $GTD = OTD - RTD$ (1-1)

then: $GTD = (A(M_P) - A(M_Q)) - (T(M_P) - T(M_Q))$ $GTD = (A(M_P) - T(M_P)) - (A(M_Q) - T(M_Q))$ $$GTD = \frac{(D_P - D_Q)}{c} \quad (1\text{-}2)$$

where:

$D_R$=distance between location L and BTS R; and
c=signal propagation speed (e.g., speed of light).

Equation (1-2) shows that the GTD equals the difference between the distances from location L to each BTS divided by c and hence depends on the geometry of the locations of the BTSs and the location L. Other locations with the same GTD as L all lie along a certain hyperbola that passes through L, with the property that the difference in the distances to the two BTSs from any point is fixed according to Equation (1-2).

For modern wireless networks, the transmission timing of any BTS is normally very stable and accurate, changing by small amounts (e.g., a fraction of 1 GSM bit in the case of GSM) over a period of a day or more. This means that the RTD between any pair of BTSs will normally be almost constant over a similar interval which in turn means that if the RTD can be determined in some way at intervals of a few hours or a day, then just by making OTD measurements, a wireless terminal will be able to derive GTD values for the various locations it occupies within range of the pair of BTSs. OTD measurements are typically not difficult to make or necessarily very resource intensive because a wireless terminal may need to monitor transmissions from nearby BTSs in order to support normal wireless operation including handover, cell change and, in the case of the serving BTS, radio contact. The additional resource use to measure signals that are already being monitored would then be small. Because GTD values depend on geometry, it would then be possible for any wireless terminal to use a set of GTD values obtained for multiple pairs of BTSs as a means of characterizing any location that it occupied. Any two GTD values obtained for a particular location from two different pairs of BTSs are normally sufficient to derive the location exactly given the locations of each of the BTSs.

Figure 5:
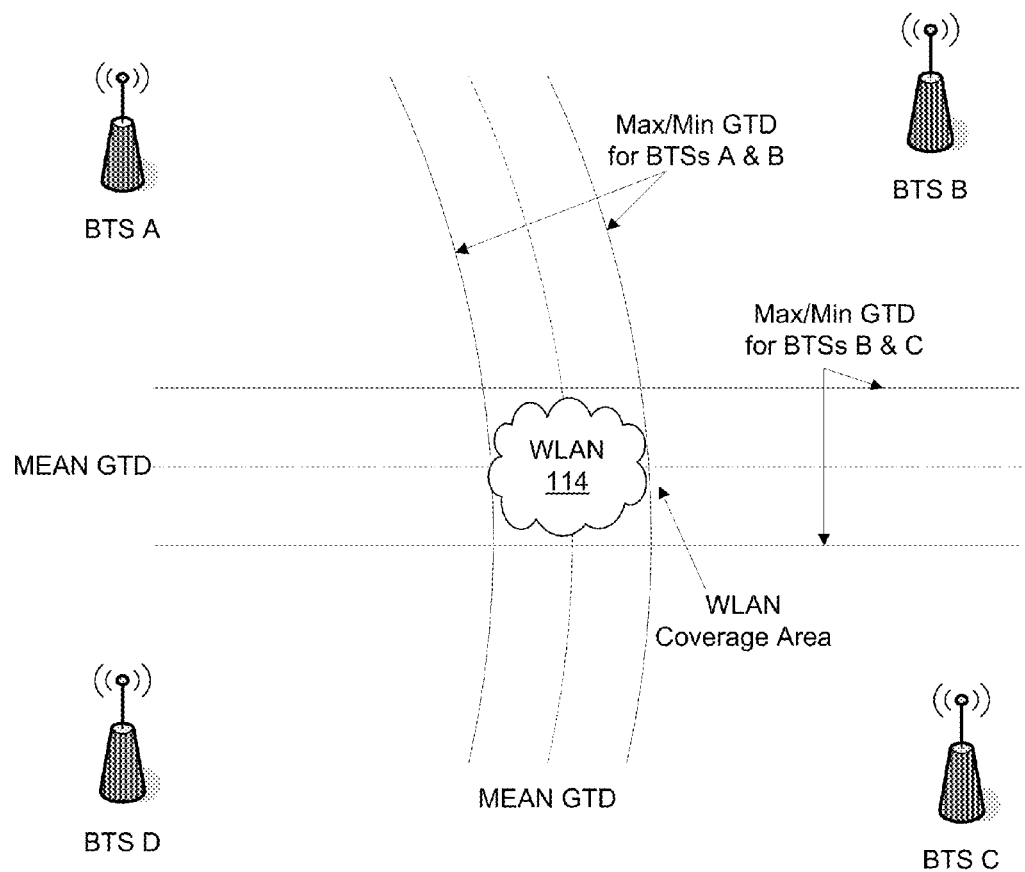
FIG. 5 is a conceptual diagram illustrating a WLAN coverage area wholly or partially included within an area defined by maximum and minimum GTD values for two pairs of BTSs.

In order to characterize the geographic area in which a particular WLAN has coverage, a wireless terminal could create a fingerprint containing a set of GTD values for pairs of BTSs whose coverage overlaps part or all of the WLAN coverage area. From the obtained GTD values, the wireless terminal could derive statistics, for example, the minimum and maximum GTD values for each pair of BTSs that applied to the entire WLAN coverage area that the wireless terminal had visited. This is illustrated in FIG. 5 for two pairs of BTSs.

Because BTS coverage in a WWAN is typically much more extensive than the coverage area of a WLAN and because each BTS can usually be detected by a wireless terminal well outside its normal service area, it will often be the case that GTD values for several pairs of BTSs will be obtainable throughout the entire coverage area of the WLAN. Even if that is not the case, it may still be possible to obtain GTDs for a number of pairs of BTSs at any location in the WLAN coverage area. By recording the minimum and maximum GTDs thus obtained for each pair of BTSs or other statistics for the GTDs, it may be possible on a later occasion when the wireless terminal returns again to the same WLAN coverage area to use the stored GTD statistics as a means of knowing that wireless terminal may be within the WLAN coverage area without having to scan for the WLAN on a continuous basis. This would then enable efficient acquisition of the WLAN.

2. Wireless Terminal

Figure 6:
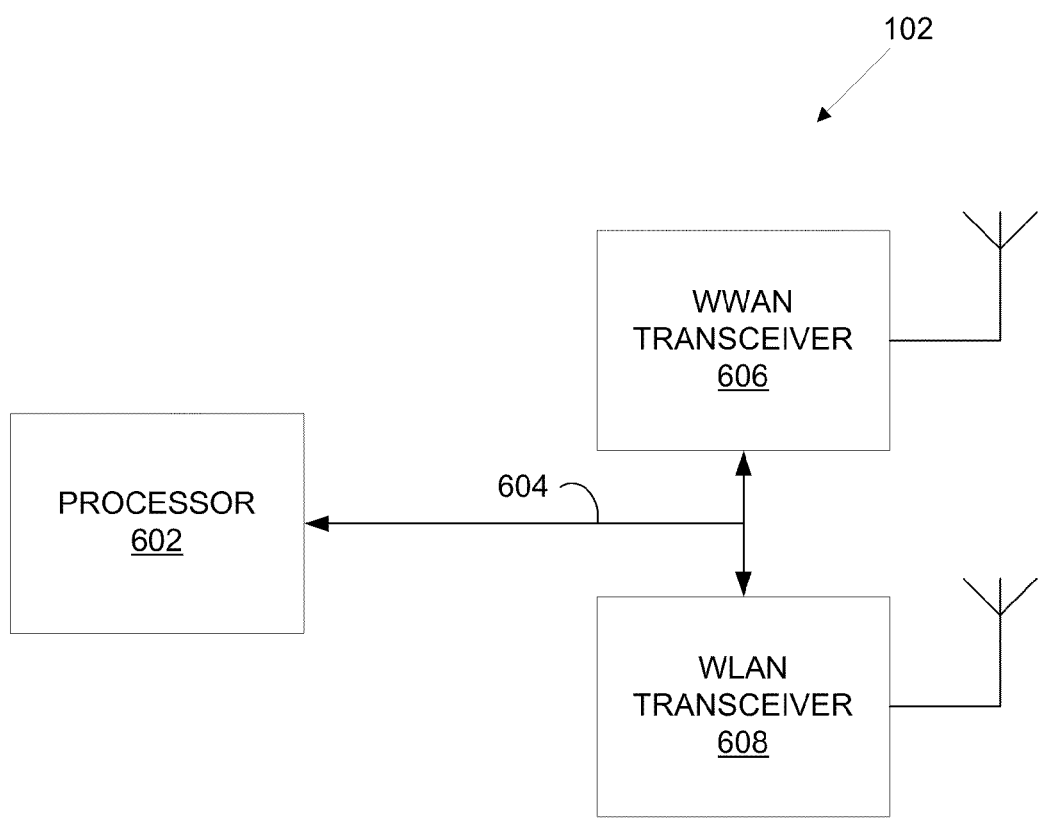
FIG. 6 is a conceptual block diagram of a wireless terminal.

FIG. 6 is a conceptual block diagram illustrating an example of a wireless terminal. The wireless terminal 102 may be configured to create a fingerprint for a particular WLAN by recording GTD statistics for that WLAN and later make use of them to efficiently acquire the WLAN. The wireless terminal 102 may be implemented in a variety of fashions. In the example shown in FIG. 6, the wireless terminal 102 includes a processor 602 which communicates with a number of peripheral devices via a system bus 604. Although the processor 602 is shown as a single entity for the purposes of explaining the operation of the wireless device 102, those skilled in the art will understand that the functionality of the processor 602 may be implemented with one or more physical processors and storage media. By way of example, the processor 602 may be implemented with a microprocessor, or an embedded processor, which supports software. Alternatively, the processor 602 may be implemented with application specific integrated circuits (ASIC), field programmable gate arrays (FPGAs), programmable logic components, discrete gates or transistor logic, discrete hardware components, or any combination thereof, either alone or in combination with a microprocessor and/or an embedded processor. Accordingly, the term "processor" is to be construed broadly to cover one or more entities in a wireless terminal that is capable of performing the various functions described throughout this disclosure. The manner in which the processor 602 is implemented will depend on the particular application and the design constraints imposed on the overall system. Those skilled in the art will recognize the interchangeability of hardware, software, firmware, middleware, microcode, and similar configurations under the circumstances, and how best to implement the described functionality for each particular application.

The wireless terminal 102 also is shown with a WWAN transceiver 606 and a WLAN transceiver 608. The WWAN transceiver 606 may be configured to support any suitable wireless protocol including, by way of example, GSM, WCDMA, cdma2000, and TDMA. The WLAN transceiver 608 may also be configured for different wireless protocols including 802.11, UWB, Bluetooth, and others. In the configuration shown in FIG. 6, each transceiver 608, 608 is shown as a separate entity, but may be integrated into a single entity or distributed across other entities in alternative configurations of the wireless terminal 102.

3. Procedure to Record GTDs and Later Acquire WLAN

Figure 7:
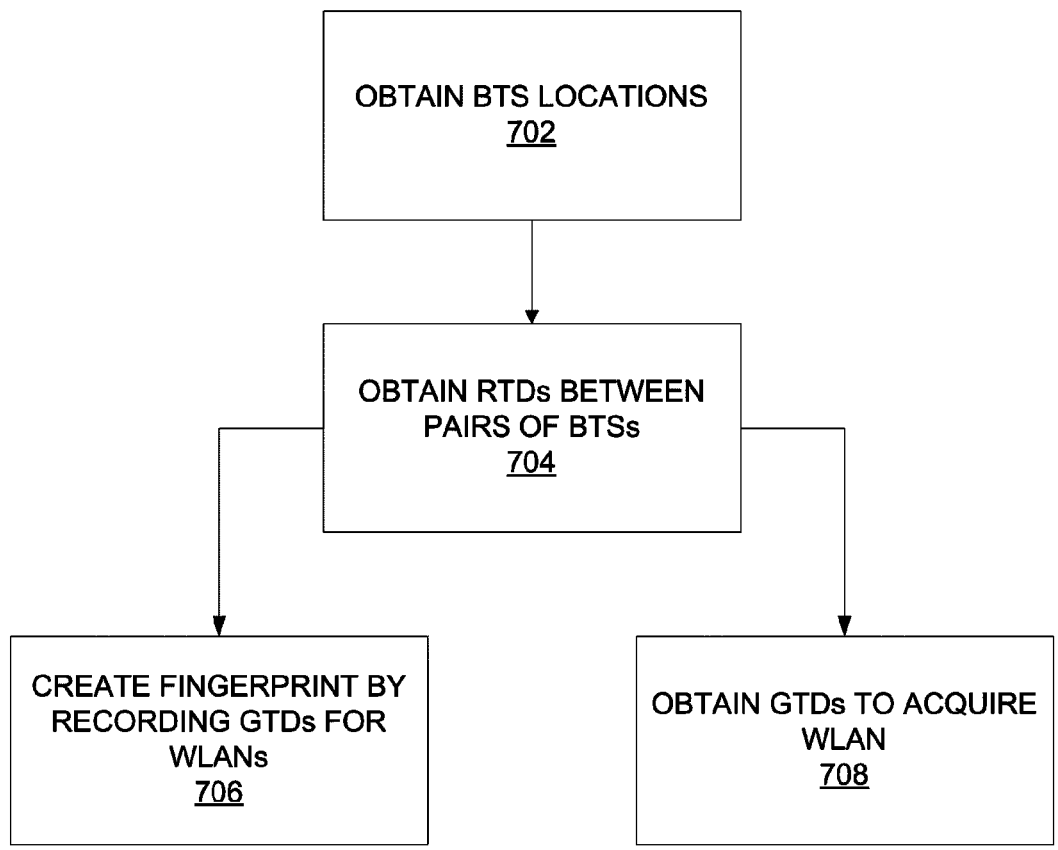
FIG. 7 is a flow chart illustrating an example of a procedure for creating a fingerprint of a WLAN and later acquiring the WLAN.

FIG. 7 is a flow chart illustrating an example of a procedure for creating a fingerprint of a WLAN and later acquiring the WLAN. This procedure may be performed by a processor as described in connection with FIG. 6, or some other entity (or entities) within the wireless terminal. In step 702, the locations of BTSs are obtained. This step is conditional on the procedure used in step 704 to obtain RTD values and may not always be needed. In step 704, the RTDs between pairs of BTSs are obtained either making use of the BTS locations obtained in step 702 or without them. Using the RTD values obtained in step 704, GTD values and statistics (e.g., minimum, maximum and mean GTD values) are obtained and recorded, in step 706, for a set of BTS pairs providing coverage within the coverage area of some WLAN. At some later point in time, the RTDs between pairs of BTSs are again obtained by repeating step 704. Repeating step 704 allows for change in RTD values over any significant time period. After step 704 is repeated, GTD values are again obtained, in step 708, for the pairs of BTS used in step 706 and are compared to the GTD statistics recorded in step 706. For example, it may be verified that the GTD values obtained in step 708 lie in between the minimum and maximum GTD values obtained in step 706 for the corresponding pairs of BTSs. When the obtained GTD values match the recorded GTD statistics, the proximity of the associated WLAN may be assumed and an attempt may be made to acquire it.

3.1 Obtaining BTS Locations

Figure 8:
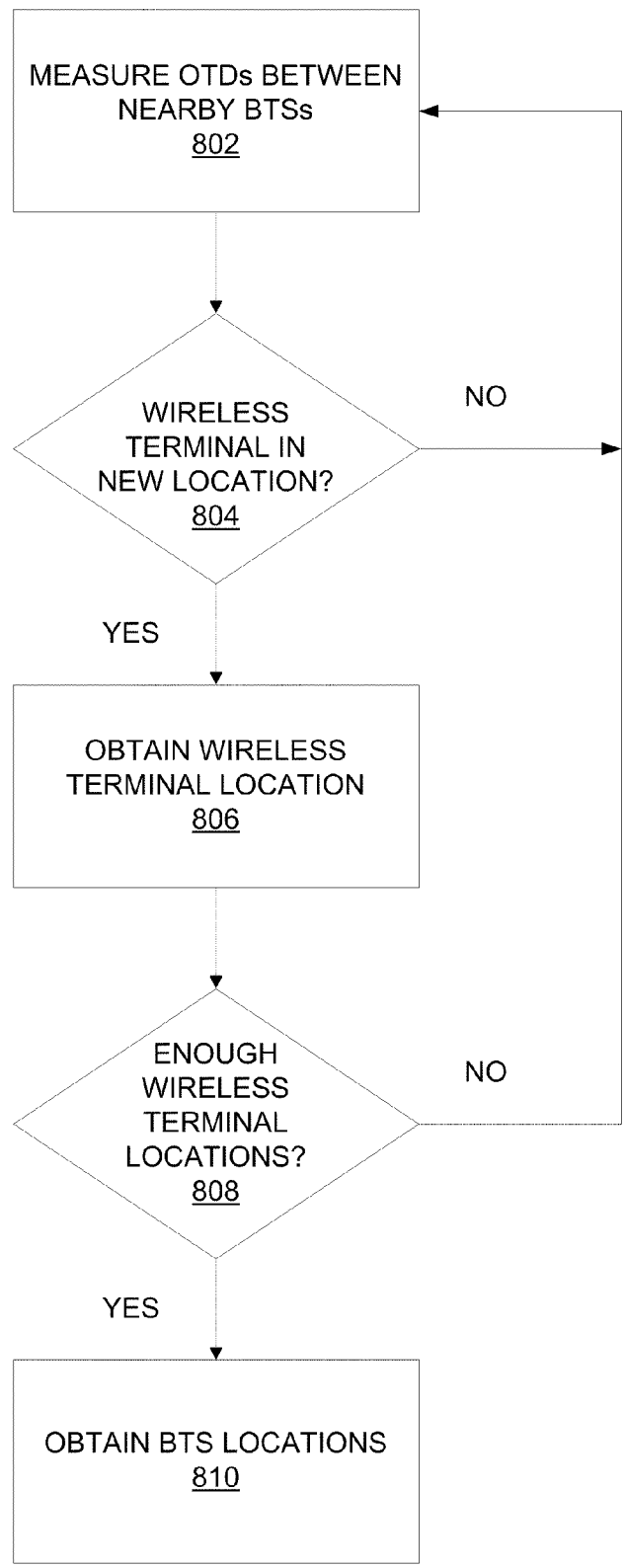
FIG. 8 is a flow chart illustrating an example of a procedure for location a BTS.

FIG. 8 is illustrating an example of a procedure for obtaining the BTS locations in step 702 of FIG. 7. In this example, a wireless terminal obtains the locations of a set of nearby BTSs. The procedure may be repeated to obtain the locations of different sets of BTSs when the wireless terminal is at other locations. The minimum number of BTSs in the set is two, but more BTSs can be included to enable the locations of more BTSs to be obtained in a single execution cycle for the procedure.

In step 802, the wireless terminal may measure OTD values between pairs of nearby BTSs belonging either to the WWAN it is currently accessing or to some other WWAN providing coverage in the same location. The OTDs measured by the wireless terminal will depend on the wireless terminal's location and may contain random measurement errors that could be quite small. Any particular set of measured OTDs will be related to the location of the wireless terminal at the time the measurements are made. The relationship of the OTDs to the location of the wireless terminal is described in more detail in section 5 of this disclosure.

In step 804, the wireless terminal decides if the OTD measurements from step 802 have been made at a new location. This will always be deemed to be true when OTDs are first measured for any new set of BTSs (i.e., whenever this step is first executed for a particular set of BTSs). When this step is executed subsequently, it may be deemed to be true if the OTD measurements differ by some minimum amount from some or all previous OTD measurements that the wireless terminal has recently stored for the same set of BTSs (e.g., stored within the last day or last few hours). For example, a significant OTD change may be assumed if the change is significantly greater than the expected error in measuring the OTD, since in that case, the change can be determined accurately. If OTD measurements from step 802 do not differ significantly from previous measurements, the measurements are not stored and the wireless terminal may wait for some interval and then repeat the step 802. If the measurements do differ, they are stored and the wireless terminal next obtains its own location in step 806 using, for example, a satellite navigation system such GPS or Galileo and possibly with assistance from the serving network, as in A-GPS. Preferably, the OTD measurements in step 802 and the location in step 806 are obtained at nearly the same point in time so that the OTD measurements in step 802 can be assumed to have been made at the location determined in step 806. The wireless terminal location is then stored in association with the OTD measurements. In the following step 808, the wireless terminal decides if it has OTD measurements from step 802 for a sufficient number of locations from step 806. This will be generally true if the wireless terminal has OTD measurements for at least one pair of BTSs at five or more different wireless terminal locations as shown in section 5 of this disclosure. If it is deemed to be true, then in step 810, using the OTD measurements made at different known wireless terminal locations, the wireless terminal may determine the BTS locations as shown in section 5 of this disclosure. If the wireless terminal does not yet have measurements for enough locations, then it returns to step 802, wherein a new set of OTD measurements may be later obtained.

In the event that the wireless terminal 102 is unable to measure OTD values between a pair of BTSs in five or more different location, an alternative procedure may be used to obtain the BTS locations. With this procedure, the wireless terminal would measure the association between the received transmission timing of some BTS and some universal time like GPS time, or its own internal clock time. If this is done by the wireless terminal at three separate locations for which the wireless terminal also obtains its location coordinates (e.g., using GPS or A-GPS), then it also becomes possible to obtain the location (e.g., latitude/longitude coordinates) of the BTS. To show how this can work, suppose that the wireless terminal associates a received transmission time T1 from the BTS with universal time U1 at location $L_1$ and subsequently associates a received transmission time T2 from the BTS with universal time U2 at location $L_2$. Suppose further that BTS transmission times T1 and T2 and universal times U1 and U2 are converted into the same time units—for example, into GSM bit times in the case of GSM. The wireless terminal may now calculate the received transmission time (T2−U2+U1) that would have been observed at location $L_2$ at universal time U1. This transmission time may have to be adjusted for any wrap-around effects if transmission timing for the BTS is defined cyclically (as is normally the case for a WWAN). The received transmission time T1 at location $L_1$ and received transmission time (T2−U2+U1) at location $L_2$ both apply at the same universal time U1. Hence their difference, (T2−T1−U2+U1), must equal the difference in the propagation times from the BTS to each location. This time difference can be converted to a distance difference by multiplying by the signal speed. This leads to the following equation:

$$(T2 - T1 - U2 + U1) = \frac{\sqrt{(y_2 - y_B)^2 + (x_2 - x_B)^2} - \sqrt{(y_1 - y_B)^2 + (x_1 - x_B)^2}}{c} \quad (3\text{-}1)$$

where:

$(x_B, y_B)$ are horizontal x, y coordinates of the BTS; and $(x_i, y_i)$ are horizontal x, y coordinates of location $L_i$ (where i=1, 2).

Equation (3-1) locates the BTS on a hyperbola defined by the x,y coordinates of the two locations $L_1$ and $L_2$ and the time difference (T2−T1−U2+U1). If the wireless terminal then obtains the association between universal timing U3 and the received BTS transmission timing T3 at a third location $L_3$ with coordinates $(x_3, y_3)$, it will be possible to obtain a second equation like Equation (3-1) in which U3, T3, $x_3$, $y_3$ replace U2, T2, $x_2$, $y_2$, respectively. This will be enough to solve for the coordinates of the BTS. This procedure has the advantage that the location of any BTS can be obtained using measurements from three locations without necessarily being able to receive signals from any other BTS. The procedure is also valid when the universal times recorded by the wireless terminal are replaced by internal clock times.

In an alternative procedure to obtain the location of a BTS, a wireless terminal could obtain the signal propagation times P1 and P2 between a particular BTS and the wireless terminal at two different locations $L_1$ and $L_2$. In some wireless technologies (e.g., GSM), the network (e.g., BTS) may be required to provide the wireless terminal with a value (e.g., derived by the BTS) equal to or related to the signal propagation time between the BTS and wireless terminal in order for the wireless technology to operate correctly. In GSM, the value provided by the BTS is for the timing advance (TA) which equals the round trip propagation delay or twice the one way propagation delay. This TA value is provided periodically to the wireless terminal whenever the wireless terminal is receiving service from the network (e.g., during a call, when registering with the network or performing a periodic registration update). Whenever a new TA value is provided (or whenever a new TA value is provided that differs significantly from previous TA values), the wireless terminal may also determine its location coordinates (e.g., using GPS or A-GPS). If the wireless terminal does this at two different locations for which the TA has been provided, it can determine values for the propagation times P1 and P2 at known locations $L_1$ and $L_2$. The wireless terminal may then calculate the distances to the BTS from the locations $L_1$ and $L_2$ as P1*c and P2*c where c is the signal propagation speed (e.g., radio transmission speed in air). Given the location coordinates for $L_1$ and $L_2$, this enables the location of the BTS to be determined This procedure has the advantage that measurements for a single BTS are needed at only two locations.

3.2 Obtaining RTD Values for Pairs of BTSs

Once the BTS locations are determined, the wireless terminal obtains RTD values between selected pairs of BTSs (see step 704 in FIG. 7). The selection of which pairs of BTSs to use will be described later in sections 3.3 and 3.4 of this disclosure.

In order to obtain RTDs, the wireless terminal may obtain its own location, for example using GPS, A-GPS or Galileo, and at the same time, or almost the same time, measures the OTDs between one or more pairs of BTSs. Using its own location and the locations of each BTS, the wireless terminal can obtain the distance to each BTS and hence the GTD for any pair of BTSs using Equation (1-2). Equation (1-1) can then be used to obtain the RTD for any pair of BTSs from the GTD and measured OTD.

In an alternative procedure, RTD values (and possibly BTS coordinates) might be provided to a wireless terminal by the network (e.g., via a broadcast service or in system information messages) thereby obviating the need for the wireless terminal to calculate these values using the procedures described herein. This will also obviate the need for the wireless terminal to be able to obtain its own location.

A wireless network supporting, for example GSM or WCDMA, can obtain RTD values using separate LMUs (Location Measurement Units) belonging to the network. An LMU is a device positioned at a fixed known location which measure OTDs between pairs of BTSs and calculates RTDs using information about its own location and the locations of the BTSs. RTDs can also be obtained if each BTS contains a GPS receiver and is able to synchronize or associate its transmission timing with GPS timing. Some GSM networks are in the process of being upgraded with GPS receivers in BTSs to enable reduced interference and higher capacity. This capability could thus be extended to deriving RTD values. Where LMUs or GPS receivers are not supported, the network could utilize GPS position estimates and OTD measurements provided by individual wireless terminals (in order to calculate RTD values given that BTS coordinates can be already known). The network will have an advantage in being able to access such measurements from many wireless terminals in each cell on a continuous basis which means RTD values can be kept constantly updated and provided to other wireless terminals as and when needed or requested.

In some cases, the BTSs in a wireless network may be kept accurately synchronized in order to provide or improve service (e.g., reduce the interference level for wireless terminals caused by non-serving BTSs). The methods used to achieve synchronization can include using a GPS receiver at each BTS to align the BTS transmission timing with universal GPS time. Other methods may also be used. If a wireless terminal is aware that BTSs are synchronized (e.g., because this is essential for the network technology to operate correctly or because this information has been provided by the network or by the network operator) then it need not perform any measurements to obtain RTD values and can instead assume that all RTD values are zero.

A third procedure may be employed to obtain RTD values if a network cannot provide RTD values explicitly or implicitly and if it is preferred to avoid using a procedure which may require having to calculate BTS locations. In this procedure, a wireless terminal could make use of the signal propagation delay P1 between itself and a BTS if this is provided directly or indirectly by the network, as for example in the case of GSM where a TA value is provided. If the wireless terminal can then accurately associate the received transmission timing T1 of the BTS with some universal time U1, such as GPS time, (or its internal clock time) then it will be able to derive the association between transmission timing at the BTS with universal time (or internal clock time) which, in this example, will be a transmission time (T1+P1) at a universal time U1 if T1 and P1 are expressed in the same time units. If the wireless terminal later repeats this procedure for another BTS, and determines a propagation delay P2, transmission time T2 and universal time U2, if can determine the RTD between the BTSs as the difference between their transmission timings adjusted to a common universal time. In this particular example, the RTD would be (T2+P2−U2)−(T1+P1−U1) if all values are first converted to use a common time unit.

3.3 Recording GTD Values for Each WLAN

Figure 9:
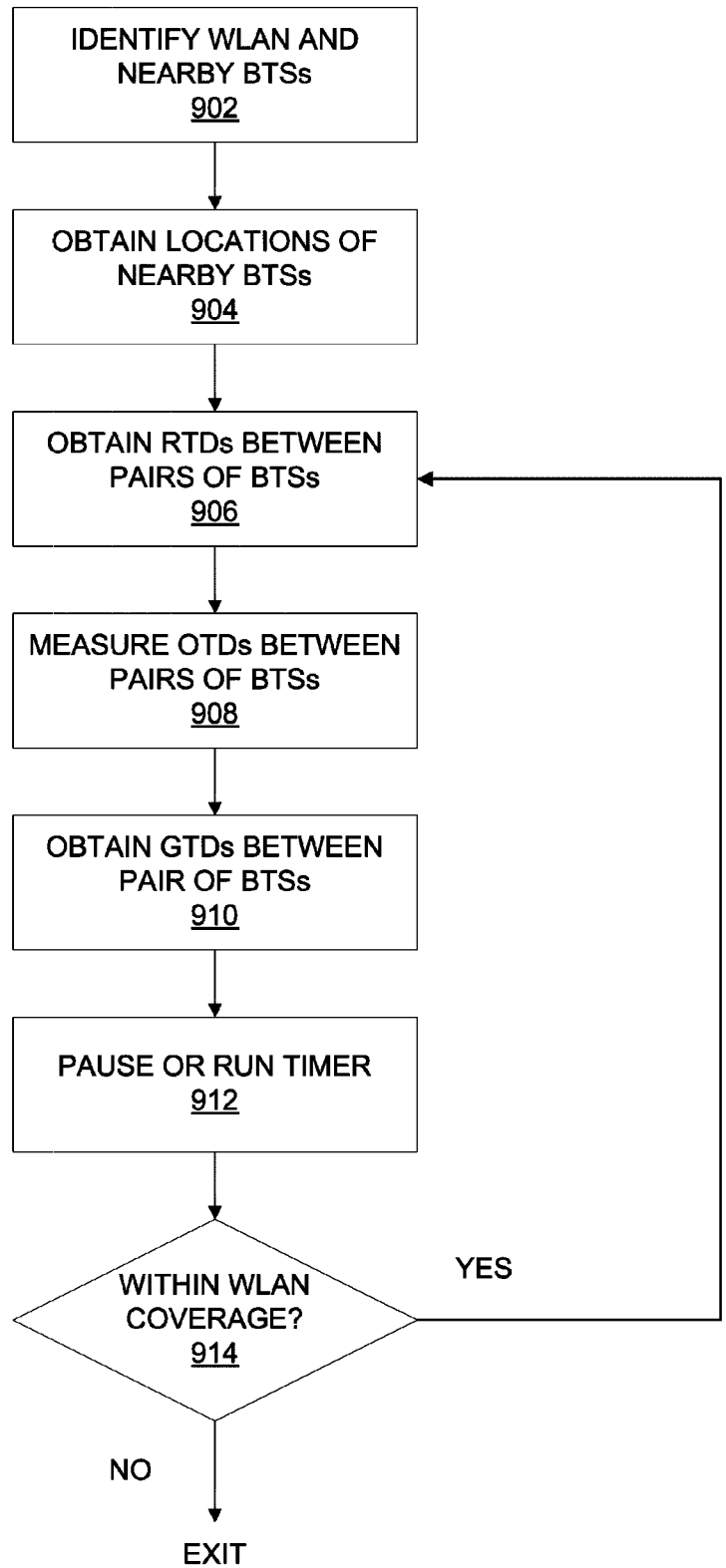
FIG. 9 is a flow chart illustrating an example of a procedure for obtaining GTD values for a WLAN.

FIG. 9 is illustrating an example of a procedure to obtain the GTD values for each WLAN (see step 706 in FIG. 7). This procedure may be performed once for any particular WLAN or may be repeated on multiple occasions to increase the amount of information collected for the WLAN. This procedure may be instigated in WLAN areas of interest. For example, it may be instigated in areas within which a wireless terminal spends significant time like the home area, office area or a frequently used shopping mall. Such areas can be deduced from usage of the same WWAN serving cell for long periods, from usage of the same serving cell on many different occasions, from proximity of the same WWAN cell for long periods (e.g., if a cell is always included in the set of cells for which handover related measurements are ordered from the serving cell) or on many different occasions or from some combination of these conditions. This procedure could also be instigated due to other factors such as when a particular WLAN is observed or is used over a long period or on multiple occasions or when ordered by the wireless terminal user or by the serving or home network.

In step 902, the wireless terminal determines that it is within coverage of a particular WLAN access point of interest (e.g., belonging to or associated with its home network operator). The wireless terminal also determines that it is within the coverage area of a number of cell sites that will be each associated with their own BTS. The wireless terminal can determine the identity of each cell site and the associated BTS by searching for a broadcast signal from each BTS above a certain minimum signal strength or from information provided by its current serving BTS. For example, the BTSs could be those indicated by a GSM or WCDMA serving BTS whose signal strength and quality the wireless terminal may be required to measure in order to support handover. For WCDMA, the BTSs (also called Node Bs) could include those currently supporting a soft handover for the wireless terminal. The BTSs and their associated cell sites could all belong to the same network or could belong to different networks. The BTSs could also belong to different networks supporting different wireless technologies (e.g., GSM and WCDMA). Normally, the serving cell and associated serving BTS would belong to this set.

In the next step 904, the wireless terminal may obtain the location of each of the BTSs determined in step 902, for example using one of the methods discussed in section 3.1 above. This may have occurred at some previous time or could occur as a prelude to the rest of this procedure. This step is not needed if BTS locations are not needed to obtain RTD values in step 906.

In the next step 906, the wireless terminal may obtain RTD values between pairs of the BTSs determined in step 902 using any of the procedures described in section 3.2 above. The pairing of BTSs can be determined in different ways. For example, if all BTSs support the same wireless technology (e.g., GSM or WCDMA), one BTS could be common to every pair—for example the serving BTS or the BTS with the strongest signal. If the BTSs support different wireless technologies, a single BTS could be chosen for each technology and paired with each of the other BTSs supporting the same technology.

In the next step 908, the wireless terminal measures OTDs between the pairs of BTSs and in step 910 obtains GTDs from the OTDs and the RTDs as defined in Equation (1-1) (and as described in greater detail in section 5 of this disclosure). If steps 908 and 910 are executed immediately following step 906, the GTDs may be obtained directly from the location of the wireless terminals and the locations of the BTSs used in step 906, as defined in Equation (1-2) and as further described in section 5 of this disclosure.

In step 912, the wireless terminal pauses (e.g., runs a timer) and then, in step 914, verifies if it is still within coverage of the WLAN identified in step 902. If not, the procedure terminates with the wireless terminal retaining the GTD values that it has obtained earlier in step 910. Otherwise, the wireless terminal repeats the OTD measurements of step 908 provided it is still within coverage of the WLAN identified in step 902. The wireless terminal then obtains a new set of GTDs by repeating step 910.

The result of this procedure is a fingerprint of a particular WLAN containing a set of GTD values for particular pairs of BTSs whose signals were received within the coverage area of that WLAN. For each pair of BTSs, the mean GTD value may then be obtained from the maximum and minimum GTD values. The minimum and maximum GTD values define a geographic area between two hyperbolae, one hyperbola associated with the minimum GTD value and the other associated with maximum GTD value, that would contain the locations of the wireless terminal when it obtained the OTD values in step 908 from which the GTD values were derived. This is illustrated in FIG. 5. Because each of the wireless terminal locations is associated with reception of the particular WLAN, the area also contains some or all of the coverage area of the particular WLAN. Some of the coverage area of the WLAN may be missing if the wireless terminal did not visit the entire coverage area. The same applies for the minimum and maximum GTDs obtained by the MS for other pairs of BTSs.

In order to ensure that the complete coverage area of the WLAN is included within the area defined by the maximum and minimum GTD values, the wireless terminal could simply continue to add more GTD values for each BTS pair for a particular WLAN by repeating this procedure at later times when it is within the same WLAN coverage area. This provides further opportunity for the wireless terminal to visit more of the WLAN coverage area. However, this may not be very efficient and the wireless terminal may not visit the entire coverage area. Another method of ensuring the entire coverage is included would be to calculate the expected difference D between the minimum and maximum GTD values that would be obtained for the entire coverage area assuming that the extent of this coverage area can be known from knowledge of the particular WLAN (e.g., the WLAN technology). This can be done, for example, using the equations in section 5 of this disclosure. The minimum and maximum GTDs can then be increased so that the difference between them is D or slightly more than D to allow for measurement errors. For example, the maximum GTD could be set to the mean GTD plus D/2 and the minimum GTD could be set to the mean GTD minus D/2. Another means of ensuring the WLAN coverage is included would just be to add and subtract some other fixed value V from the mean GTD to obtain modified maximum and minimum GTD values. To allow for the likelihood that the mean GTD does not represent the center of the WLAN coverage area, V could exceed D/2, although need not exceed D. If the difference between the minimum and maximum measured GTDs is d, setting V to (D−d/2) would normally ensure that the entire WLAN coverage area is included within the resulting modified maximum and minimum GTD values.

The wireless terminal then stores in association with the WLAN the set of BTSs determined in step 902, their associated cell identities, the minimum and maximum GTDs obtained between pairs of BTSs and possibly other GTD statistics.

3.4 WLAN Detection

Figure 10:
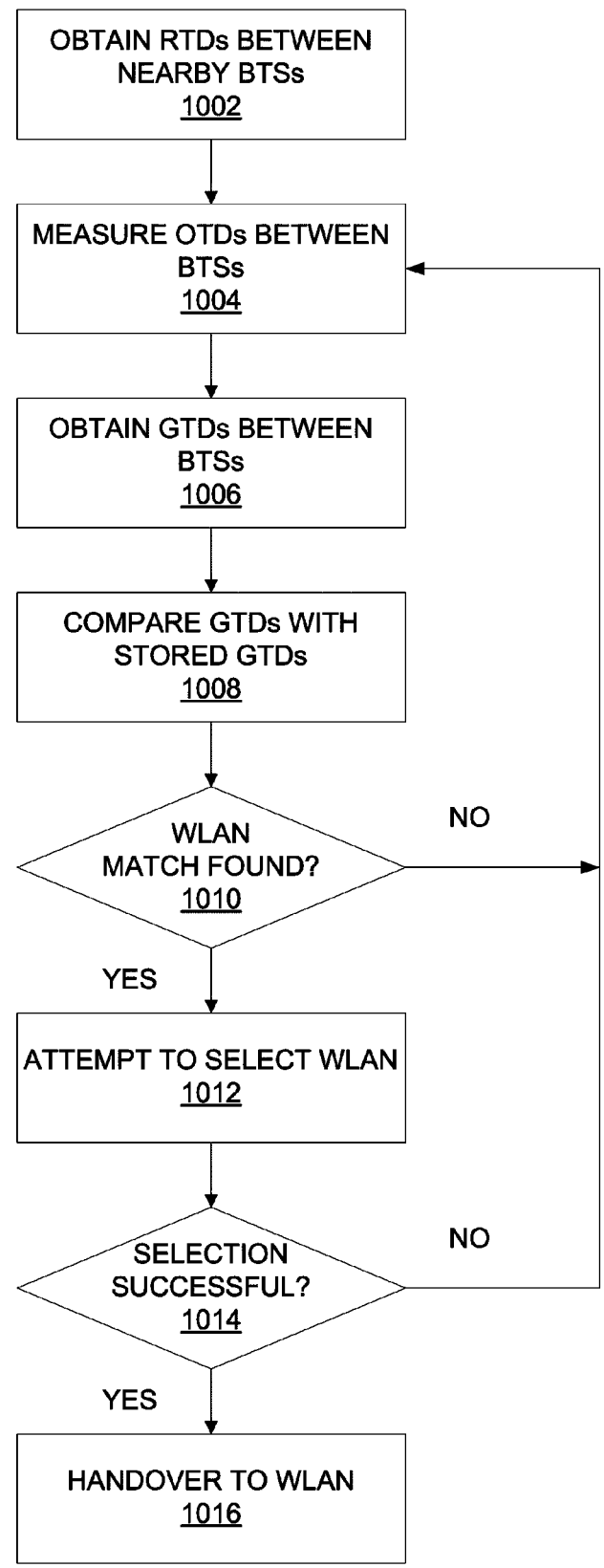
FIG. 10 is a flow chart illustrating an example of a procedure for detecting a WLAN associated with a WWAN.

FIG. 10 is a flow chart illustrating an example of a procedure used for WLAN detection in step 708 of FIG. 7. With this procedure, the wireless terminal makes use of the minimum and maximum GTD values and possibly other GTD statistics previously obtained using the procedure described above in section 3.3 for a particular set of BTSs (each associated with a particular cell site) for one or more WWANs as a means to detect that it may be within the coverage area of a certain WLAN.

This procedure is instigated when the wireless terminal detects two or more BTSs, for which GTD values have been obtained for some WLAN of interest. For example, the wireless terminal may determine that the current serving BTS is one of these BTSs. Preferably, the wireless terminal also verifies that signals can be received from many or all BTSs for which GTD values were previously obtained within the WLAN coverage area as described above in section 3.3.

In a first step 1002, the wireless terminal instigates any of the procedures in section 3.2 to obtain the RTD values betweens the same pairs of BTSs for which GTD values were stored to create a fingerprint as described earlier in section 3.3.

In the next step 1004, the wireless terminal measures OTD values between the pairs of BTSs. Then in step 1006, the wireless terminal obtains the GTD values between the pairs of BTSs from the OTD and RTD values as defined in Equation (1-1). In step 1008, the wireless terminal compares the GTD values obtained in step 1006 with the minimum and maximum GTD values (or other GTD statistics) previously obtained as described earlier in section 3.3 for each BTS pair. If all (or most of) the obtained GTD values lie in between the corresponding minimum and maximum GTD values, the wireless terminal may conclude in step 1010 that it may be within the coverage area of the WLAN and may then attempt to acquire signals from the WLAN in step 1012. If the wireless terminal is able to receive a signal from the WLAN, it may then decide in step 1014 to attempt to handover any ongoing services (e.g., call) to the WLAN in step 1016 or simply camp on the WLAN signal if currently idle. If in, step 1010, the GTD values do not all lie within the corresponding minimum and maximum GTD values or if, in step 1012, the wireless terminal is unable to acquire a signal from the WLAN, the wireless terminal may repeat step 1004 a short while later. In this case, as the wireless terminal moves around, it may eventually enter the coverage area of the WLAN. When that occurs, the GTD values obtained in step 1006 would generally all lie within the earlier obtained minimum and maximum GTD values, allowing the wireless terminal to know that it may be within coverage and to attempt to acquire the WLAN. If the wireless terminal instead moves away from the coverage area of the WLAN, it may eventually not be able to detect, or not be able to measure OTD values between, some or all of the BTSs for which GTD values have been obtained previously for the WLAN. If this occurs, the wireless terminal may exit the procedure (e.g., after attempting unsuccessfully to re-execute step 1004).

4. Extension to Multiple WLANs

The various concepts and techniques described herein enables a wireless terminal to determine when it is likely to be within the coverage area of a specific WLAN. These concepts and techniques can be extended to enable the wireless terminal to determine when it is likely to be within the coverage area of any one of a number of WLANs by repeating the procedures described above either separately for each WLAN or in parallel. The wireless terminal can also be enabled to determine that, at any location, it is likely to be within the coverage area of more than one WLAN. In this case, the procedure for detecting a WLAN described in section 3.4 above would be repeated, at the same location, for more than one WLAN (either serially or in parallel) and could yield the result that the wireless terminal is within the coverage of two or more WLANs. The wireless terminal would then have the option of attempting to select any of these WLANs (e.g., the most preferred WLAN).

5. Extension Using WWAN Assistance

The fingerprint information for any WLAN that may be created by a wireless terminal using, for example, the method described in section 3.3, may also be provided either in part or completely to the wireless terminal by the network—for example by the home WWAN for the wireless terminal or by the serving WWAN. This fingerprint information may include the identities of one or more pairs of BTSs that can be detected within the WLAN coverage area and GTD statistics for each pair of BTSs (e.g., mean, minimum and maximum GTDs) that apply to the WLAN coverage area. There may be a benefit to providing this information to avoid the time and resource usage in each wireless terminal that would otherwise be needed to obtain this information. In addition, the information can be more reliable. For example, a network operator may know the precise coordinates of its own BTSs and possibly of BTSs belonging to other networks and may know the locations of WLANs (e.g., the location coordinates of WLAN Access Points). The network operator may then be able to precisely calculate GTD statistics without needing to perform any measurements. The calculated information may then be provided to wireless terminals on request or as decided by the network or as part of system or other broadcast information.

In some cases, a network operator may not know the locations of some WLANs or the coordinates of some BTSs. In that case, the network operator might not be able to calculate any fingerprint information (e.g., GTD statistics) for some WLANs and/or might not be able to calculate some fingerprint information for other WLANs—for example, fingerprint information comprising information (e.g., GTD statistics) related to certain pairs of BTSs. In other cases, a network operator may not wish to support the overhead of discovering WLAN and BTS locations or the overhead of performing fingerprint calculations. In these cases, wireless terminals may obtain fingerprint information for WLANs using, for example, the method of section 3.3. Wireless terminals may then provide a network, e.g. the home network or current serving network, with the fingerprint information that was obtained. The network may then combine the fingerprint information received from many wireless terminals to obtain fingerprint information for a greater number of WLANs—for example, for all WLANs visited by the reporting wireless terminals. In addition, the network may combine fingerprint information received from different wireless terminals concerning the same WLAN in order to obtain more reliable fingerprint information for this WLAN. For example, if two different wireless terminals provide GTD statistics for the same WLAN related to different pairs of BTSs, the network can combine the information and obtain GTD statistics for the combined set of BTS pairs. Also, if both wireless terminals provide GTD information for the same WLAN concerning the same pairs of BTSs, the network may combine the information for each pair of BTSs. For example, the network may take the higher of two provided maximum GTD values, the lower of two provided minimum GTD values and/or the mean of two provided mean GTD values. If many wireless terminals provide GTD information for the same WLAN concerning the same pairs of BTSs, the network may also detect erroneous GTD information by looking for GTD information from any wireless terminal that is different to or not consistent with the GTD information provided by the other, or most of the other, wireless terminals.

The combined fingerprint information may then be provided to individual wireless terminals—e.g. on request, as decided by the network or through broadcast. With this extension, a wireless terminal will be able to acquire fingerprint information much faster than it can alone and for a much larger number of WLANs. Furthermore, the acquired fingerprint information can be more accurate and reliable.

6. Obtaining BTS Locations and RTD and GTD Values Using OTD Measurements

An example of a procedure for locating both wireless terminals and BTSs using OTD measurements will now be described. The procedure can be extended to enable derivation of RTD values and GTD values also.

If a wireless terminal measures the OTD between pairs of nearby BTSs belonging to some WWAN—and provided the WWAN technology supports transmission with implicit or explicit timing information such as the explicit frame and bit numbering used in GSM—the location of the terminal can be obtained by trilateration. This method is employed by the Enhanced Observed Time Difference method (E-OTD) for GSM wireless networks, the Observed Time Difference of Arrival method (OTDOA) for WCDMA wireless networks and the Advanced Forward Link Trilateration method (A-FLT) for cdma2000 and IS-95 wireless networks. With the E-OTD, OTDOA and A-FLT methods, the locations of BTSs are assumed to be available.

The procedure makes use of measurements by any wireless terminal of OTDs between pairs of nearby BTSs, preferably at the same time or almost the same time. The procedure may require that the OTD capable terminal can also be located using a separate independent, accurate and reliable method such as GPS or A-GPS.

Figure 4:
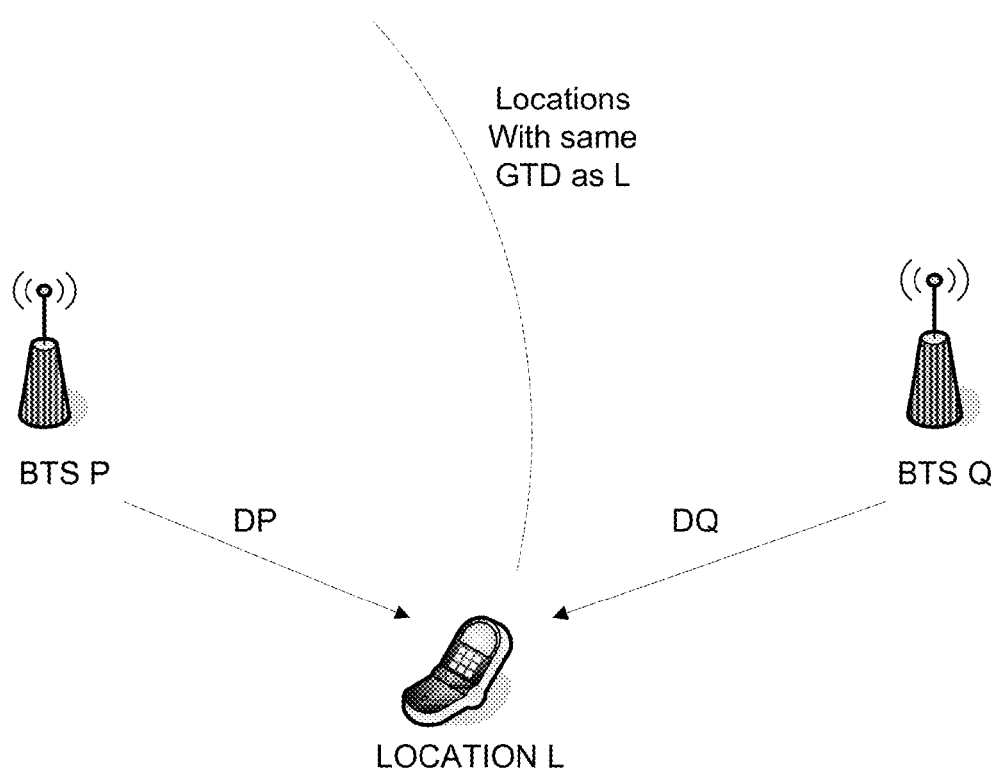
FIG. 4 is a conceptual diagram illustrating how the GTD (Geometric Time Difference) for a pair of BTSs (Base Transceiver Stations) may be obtained.
Figure 11:
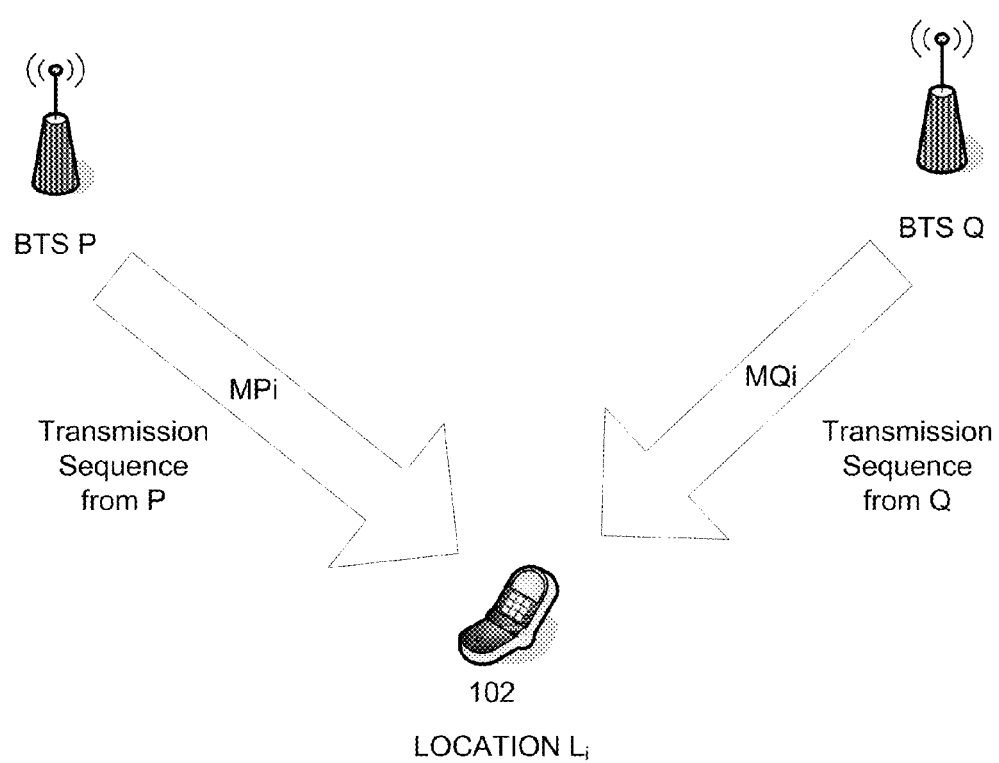
FIG. 11 is a conceptual diagram illustrating a wireless terminal receiving transmissions from a pair of BTSs.

To exemplify the procedure, suppose that BTSs P and Q, for example the BTSs P and Q shown in FIG. 4, each transmit a sequence of information (e.g., binary encoded) that contains implicit or explicit time references, as illustrated in FIG. 11. Each sequence is assumed to be regularly repeating at some fixed interval TP in the case of BTS P and TQ in the case of BTS Q and to have a duration that may be equal to or less than the fixed repetition interval. By regular repetition, it is meant that an identifiable information structure is regularly repeated (e.g., a GSM frame) but not that all, or even any, of the information contained in the repeated structure is repeated (although, of course, it may be). A particular wireless terminal 102, at some location $L_i$, is assumed to measure the OTDi between the arrival at the wireless terminal 102 of some identified transmission marker $M_{Pi}$ in the transmission from BTS P and another transmission marker $M_{Qi}$ in the transmission from BTS Q. $M_{Pi}$ and $M_{Qi}$ could, for example, be the beginning or end of the repeated transmission sequence or some identifiable point in the middle. To ensure accuracy, the transmissions should maintain high precision and stability though transmission drift can be allowed. There is no need for synchronized transmissions.

The RTDi between the transmission markers measured by the wireless terminal 102 is defined as the difference between their absolute transmission times from each BTS rather than the difference between their arrival times at the wireless terminal 102 (which gives OTDi). The RTDi is equal to the OTDi if the wireless terminal 102 is equidistant between both BTSs. Otherwise, the RTDi and OTDi are related to the distances between the wireless terminal 102 and BTS P and BTS Q as follows:

Let $T(M_{Ri})$=Absolute transmission time of marker $M_{Ri}$ at BTS R; and $A(M_{Ri})$=Absolute arrival time of marker $M_{Ri}$ at Location $L_i$, where: R=P or Q.

Then: $OTDi = A(M_{Pi}) - A(M_{Qi})$ (6-1)

$RTDi = T(M_{Pi}) - T(M_{Qi})$ (6-2)

$$OTDi - RTDi = GTDi \quad (6\text{-}3)$$
$$= (A(M_{Pi}) - A(M_{Qi})) - (T(M_{Pi}) - T(M_{Qi}))$$
$$= (A(M_{Pi}) - T(M_{Pi})) - (A(M_{Qi}) - T(M_{Qi}))$$
$$= \frac{D_{Pi} - D_{Qi}}{c}$$
$$= \frac{\sqrt{(y_i - y_P)^2 + (x_i - x_P)^2} - \sqrt{(y_i - y_Q)^2 + (x_i - x_Q)^2}}{c} \quad (6\text{-}4)$$

where:
GTDi=Geometric Time Difference at the location $L_i$;
$D_{Ri}$=distance between $L_i$ and BTS R;
($x_R$, $y_R$) are horizontal x, y coordinates of BTS R location; and
($x_i$, $y_i$) are horizontal x, y coordinates of location $L_i$.

If the horizontal coordinates for the location $L_i$ of the wireless terminal 102 are obtained independently using, for example, GPS or A-GPS location, then there are five unknown variables in Equation (6-4)—the x and y coordinates for each BTS and the RTD between the markers $M_{Pi}$ and $M_{Qi}$. Measurements of the OTDs for the same markers at five different locations $L_i$ (i=1, 2, 3, 4, 5) would then generally be sufficient to solve for these five variables.

Measurement of exactly the same markers by the same wireless terminal 102 would not be possible since the terminal would necessarily make measurements at different times. Because of this, the values for the RTDi (i=1, 2, 3 . . . ) may not all be the same. However, if the differences between the RTDs can be obtained then each RTD can be expressed in terms of one common unknown RTD allowing Equation (6-4) to be solved for this RTD value and for the coordinates of the two BTSs if 5 separate OTD measurements are made by wireless terminal 102 at 5 separate locations.

For different measurements made by the wireless terminal 102 at different locations $L_i$ (where i=1, 2, 3 . . . ), the RTDs applicable to the measurements made at any two locations $L_j$ and $L_k$ (where j≠k) are related as follows:

$$RTDj - RTDk = [T(M_{Pj}) - T(M_{Qj})] - [T(M_{Pk}) - T(M_{Qk})] \quad (6\text{-}5)$$
$$= [T(M_{Pj}) - T(M_{Pk})] - [T(M_{Qj}) - T(M_{Qk})]$$

Equation (6-5) enables the RTD difference to be obtained if the time interval between two identifiable transmission markers from the same BTS is known. This will be possible if the two transmission markers occur in the same transmission sequence and their relative times of occurrence in the transmission sequence are known. This will also be possible when the two transmission markers occur in different transmission sequences if the interval of time from the beginning of each transmission sequence to the respective transmission marker and the time interval between the beginnings of the two transmission sequences are all known. The time interval between the beginnings of the two transmission sequences can be known when the time interval between consecutive transmission sequences is known and fixed and when each transmission sequence carries an explicit or implicit sequence number, thereby allowing the number of transmission sequences from that containing the first marker to that containing the second marker to be obtained. If sequences are not numbered, then there is an ambiguity in the value of the RTD difference in Equation (6-5) that is of the form (n*TP+m*TQ) where n and m are positive or negative integers, corresponding to the unknown number of transmission sequences between the markers from each BTS and TP and TQ are the assumed fixed intervals between the beginnings of consecutive transmission sequences from BTS P and BTS Q, respectively. However, if the repetition interval for the transmission sequences is the same for each BTS (i.e., TP=TQ) and is large compared to the maximum absolute value of the right hand side of Equation (6-4) (i.e., BTS propagation delay to any terminal is much less than the repetition interval), then the ambiguity in the RTD difference disappears since at most one value for the uncertainty (n+m)*TP will provide a solution to Equation (6-4).

If transmission from the BTSs P and Q is not stable but drifts over time, then the absolute transmission time of any signal $S_R(t)$ from either BTS R with an intended transmission time of t may drift as follows:

$$T(S_R(t)) = t + a_{R1}t + a_{R2}t^2 + a_{R3}t^3 + \ldots \quad (6\text{-}6)$$

where R=P or Q; and
$a_{Ri}$=fixed small coefficient (where i≥1).

For two transmission markers, one from each BTS, with intended transmission times of $(t+\Delta t_P)$ and $(t+\Delta t_Q)$ that are each very close to t, the RTD as obtained for these transmission markers will be approximately given by:

$$RTD(t) = T(S_P(t + \Delta t_P)) - T(S_Q(t + \Delta t_Q))$$

$$= [(t + \Delta t_P) + a_{P1}(t + \Delta t_P) + a_{P2}(t + \Delta t_P)^2 + a_{P3}(t + \Delta t_P)^3 + \ldots] -$$

$$[(t + \Delta t_Q) + a_{Q1}(t + \Delta t_Q) + a_{Q2}(t + \Delta t_Q)^2 + a_{Q3}(t + \Delta t_Q)^3 + \ldots]$$

$$\approx (\Delta t_P - \Delta t_Q) + (a_{P1} - a_{Q1})t + (a_{P2} - a_{Q2})t^2 + (a_{P3} - a_{Q3})t^3 + \ldots \quad (6\text{-}7)$$

$$\approx RTD + b_1 t + b_2 t^2 + b_3 t^3 + \ldots \quad (6\text{-}8)$$

where: $RTD = (\Delta t_P - \Delta t_Q)$; and $b_i = (a_{Pi} - a_{Qi})$ where $i \geq 1$.

Equation (6-7) is obtained by ignoring small terms of order $(a_{Ri} \Delta t_R)$ (where R=P or Q, and $i \geq 1$). The resulting RTD in Equation (6-8) contains the true RTD that would apply without any drift plus a number of error terms corresponding to a linear, quadratic, cubic etc. drift in time.

For linear only drift of the RTD, which results when transmission timing only has a linear drift which is well known as the most common type of drift, the coefficients $b_i$ would all be zero for $i > 1$. For quadratic only drift, $b_i$ would all be zero for $i > 2$ and so on. Typically, the higher coefficients will be zero or almost zero, which means that the number of variables to solve for in Equation (6-4), when the RTD in Equation (6-4) comes from Equation (6-8), is increased by the small number of unknown non-zero coefficients in Equation (6-8). By adding the same number of additional OTD measurements from the terminals at more locations, the coordinates of the BTSs will still be obtainable.

Once BTS locations have been obtained, Equation (6-4) may be used to obtain the RTD between a pair of BTSs using specific transmission markers that are repeated at the same fixed interval from each BTS. In the case of GSM and WCDMA, the use of regularly repeating transmission frames of a fixed known duration enables such markers to be chosen. For example, the markers could be the start of each consecutive GSM transmission frame. Using such markers, RTDs applicable at different times at different locations can be the same since the terms in Equation (6-5) would be zero. The RTD for any pair of BTSs then defines the time period for which transmission from one BTS leads or lags behind that from another BTS. If the location coordinates of the wireless terminal 102 are then obtained and at almost the same time the terminal measures the OTD between the pair of BTSs, the RTD is obtainable from Equation (6-4).

The GTD defined in Equation (6-3) for any pair of BTSs depends on the location $L_i$ and the locations of the BTSs as shown in Equation (6-4), and not on the particular OTD or RTD values. Equation (6-3) shows that the GTD for any location can be obtained by measuring the OTD at that location if the RTD is already known (e.g., was obtained previously at some other location and at some previous time). Equation (6-4) also shows that GTDs may be obtained from the location of the terminal and the locations of the BTSs.

7. Aspects of a Method for Locating a First Network

Figure 12:
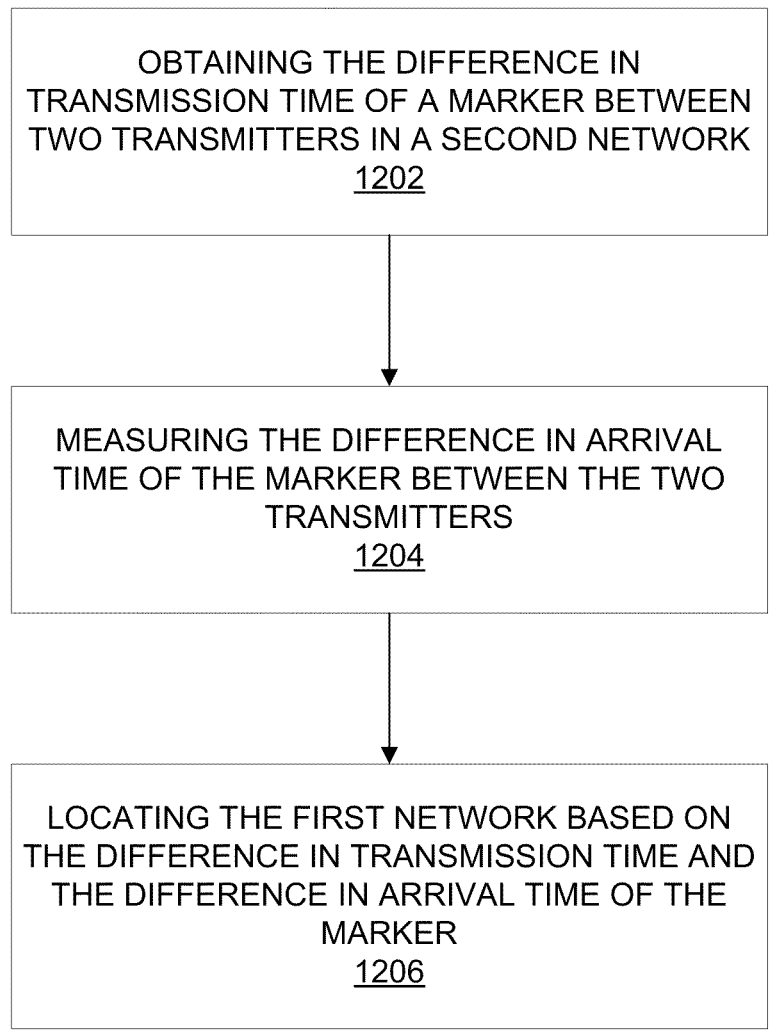
FIG. 12 is a flow chart illustrating an example of a method for locating a first network.

FIG. 12 is a flow chart illustrating an example of a method for locating a first network. In step 1202, the difference in transmission time of a marker between two transmitters in a second network is obtained. In one aspect of this method, this may be achieved by obtaining the location of each of the two transmitters and using the locations and the differences in arrival time of the marker to obtain the difference in transmission time of the marker. The location of each of the two transmitters may be obtained using the difference in arrival time of the marker between the two transmitters and the location of where the markers are received. Alternatively, the location of one (or both) of the transmitters may be obtained using the arrival time of the marker from said one of the transmitters and the location of where the marker from said one of the transmitters is received, or using the signal propagation time of the marker from said one of the transmitters at two different locations. In an alternative aspect of this method, the difference in transmission time of the marker between the two transmitters may be provided by the second network. In another alternative aspect of this method, the difference in transmission time of the marker between the two transmitters may be obtained by using the signal propagation delay of the marker and the time of arrival of the marker for each of the two transmitters.

In step 1204, the difference in arrival time of the marker between the two transmitters is measured.

In step 1206, the first network is located based on the difference in transmission time and the difference in arrival time of the marker. The first network may be located by comparing the difference in transmission time and the difference in arrival time of the marker to a fingerprint the first network. The fingerprint is created by detecting the first network and recording the difference in transmission time and the difference in arrival time of the marker when the first network is detected. Once the first network is located, it may be accessed.

8. Aspects of a Wireless Terminal

Figure 13:
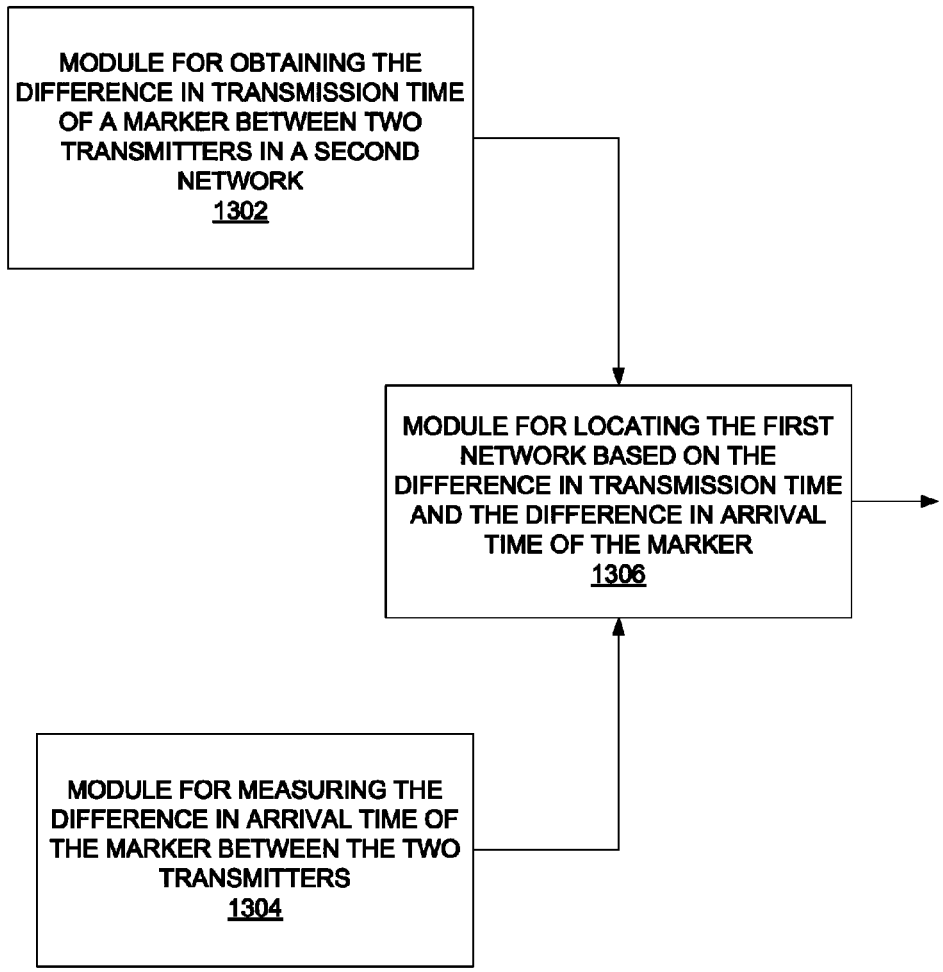
FIG. 13 is a functional block diagram illustrating an example of a wireless terminal configured to operate in a first network.

FIG. 13 is a functional block diagram illustrating an example of a wireless terminal configured to operate in a first network. The wireless terminal 102 includes a module 1302 for obtaining the difference in transmission time of a marker between two transmitters in a second network. In one aspect of a wireless terminal 102, this may be achieved by obtaining the location of each of the two transmitters and using the locations and the differences in arrival time of the marker to obtain the difference in transmission time of the marker. The location of each of the two transmitters may be obtained using the difference in arrival time of the marker between the two transmitters and the location of where the markers are received. Alternatively, the location of one (or both) of the transmitters may be obtained using the arrival time of the marker from said one of the transmitters and the location of where the marker from said one of the transmitters is received, or using the signal propagation time of the marker from said one of the transmitters at two different locations. In an alternative aspect of a wireless terminal 102, the difference in transmission time of the marker between the two transmitters may be provided by the second network. In another alternative aspect of a wireless terminal, the difference in transmission time of the marker between the two transmitters may be obtained by using the signal propagation delay of the marker and the time of arrival of the marker for each of the two transmitters.

The wireless terminal 102 also includes a module 1304 for measuring the difference in arrival time of the marker between the two transmitters.

The wireless terminal 102 further includes a module 1306 for locating the first network based on the difference in transmission time and the difference in arrival time of the marker. The first network may be located by comparing the difference in transmission time and the difference in arrival time of the marker to a fingerprint of the first network. The fingerprint of the first network may be created by detecting the first network and recording the difference in transmission time and the difference in arrival time of the marker when the first network is detected. Once the first network is detected, it may be accessed by the wireless terminal 102.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for a mobile device to locate a wireless local area network (WLAN), the method comprising:
   recording geometric time difference (GTD) statistics for the WLAN comprising:
      recording a first minimum GTD between a first pair of transmitters; and
      recording a first maximum GTD between the first pair of transmitters;
   computing a first current GTD based on current measurements from the first pair of transmitters; and
   checking for coverage within the WLAN based on the first current GTD being between the first minimum GTD and the first maximum GTD.

2. The method of claim 1, wherein recording the GTD statistics further comprises:
   recording a second minimum GTD between a second pair of transmitters; and
   recording a second maximum GTD between the second pair of transmitters;
   wherein the method further comprises computing a second current GTD based on current measurements from the second pair of transmitters; and
   wherein checking for coverage within the WLAN is further based on the second current GTD being between the second minimum GTD and the second maximum GTD.

3. The method of claim 2, wherein:
   the first pair of transmitters comprise a first base station and a second base station; and
   the second pair of transmitters comprise a third base station and a fourth base station.

4. The method of claim 1, wherein recording the GTD statistics further comprises receiving the first minimum GTD and the first maximum GTD from a network.

5. The method of claim 1, wherein recording the GTD statistics further comprises:
   computing the first minimum GTD based on measurements from the first pair of transmitters while the mobile device is at a first location within coverage of the WLAN; and
   computing the first maximum GTD based on measurements from the first pair of transmitters while the mobile device is at a second location within coverage of the WLAN.

6. The method of claim 1, wherein the GTD statistics comprises values computed by at least one other mobile device.

7. The method of claim 1, wherein computing the first current GTD comprises determining a location for each of the first pair of transmitters.

8. The method of claim 7, wherein determining the location for each of the first pair of transmitters comprises receiving the location for each of the first pair of transmitters from a network.

9. The method of claim 1, wherein computing the first current GTD comprises determining a difference between an observed time difference (OTD) and a real time difference (RTD) for the current measurements.

10. The method of claim 9, wherein determining the RTD comprises receiving the RTD for the first pair of transmitters from a network.

11. The method of claim 1, wherein the first pair of transmitters belongs to a synchronous network, and wherein the first current GTD is equal to a first current observed time difference (OTD) for the current measurements.

12. A mobile device for locating a wireless local area network (WLAN), the mobile device comprising a processor and memory wherein the memory includes software instructions to:
   record geometric time difference (GTD) statistics for the WLAN comprising software instructions to:
      record a first minimum GTD between a first pair of transmitters; and
      record a first maximum GTD between the first pair of transmitters;
   compute a first current GTD based on current measurements from the first pair of transmitters; and
   check for coverage within the WLAN based on the first current GTD being between the first minimum GTD and the first maximum GTD.

13. The mobile device of claim 12, wherein the software instructions to record the GTD statistics further comprises software instructions to:
   record a second minimum GTD between a second pair of transmitters; and
   record a second maximum GTD between the second pair of transmitters;
   wherein the software instructions further comprise software instructions to compute a second current GTD based on current measurements from the second pair of transmitters; and
   wherein the software instructions to check for coverage within the WLAN is further based on the second current GTD being between the second minimum GTD and the second maximum GTD.

14. A mobile device for locating a wireless local area network (WLAN), the mobile device comprising:
   means for recording geometric time difference (GTD) statistics for the WLAN comprising:
      means for recording a first minimum GTD between a first pair of transmitters; and
      means for recording a first maximum GTD between the first pair of transmitters;
   means for computing a first current GTD based on current measurements from the first pair of transmitters; and means for checking for coverage within the WLAN based on the first current GTD being between the first minimum GTD and the first maximum GTD.

15. The mobile device of claim 14, wherein means for recording the GTD statistics further comprises:
means for recording a second minimum GTD between a second pair of transmitters; and
means for recording a second maximum GTD between the second pair of transmitters;
wherein the mobile device further comprises means for computing a second current GTD based on current measurements from the second pair of transmitters; and
wherein the means for checking for coverage within the WLAN is further based on the second current GTD being between the second minimum GTD and the second maximum GTD.

16. A computer program product, comprising a non-transitory computer-readable medium having a computer-readable program code embodied therein, said computer-readable program code adapted to be executed to implement a method for generating a report, said method comprising:
recording geometric time difference (GTD) statistics for the WLAN comprising:
recording a first minimum GTD between a first pair of transmitters; and
recording a first maximum GTD between the first pair of transmitters;
computing a first current GTD based on current measurements from the first pair of transmitters; and
checking for coverage within the WLAN based on the first current GTD being between the first minimum GTD and the first maximum GTD.

17. A non-transitory computer-readable storage medium including program code stored thereon, comprising program code to:
record geometric time difference (GTD) statistics for the WLAN comprising program code to:
record a first minimum GTD between a first pair of transmitters; and
record a first maximum GTD between the first pair of transmitters;
compute a first current GTD based on current measurements from the first pair of transmitters; and
check for coverage within the WLAN based on the first current GTD being between the first minimum GTD and the first maximum GTD.

* * * * *